US012736725B2

(12) United States Patent
Sato et al.

(10) Patent No.: US 12,736,725 B2
(45) Date of Patent: Sep. 15, 2026

(54) STACKED BODY FOR DISPLAY DEVICE AND DISPLAY DEVICE

(71) Applicant: DAI NIPPON PRINTING CO., LTD., Tokyo (JP)

(72) Inventors: Jun Sato, Tokyo (JP); Saori Kawaguchi, Tokyo (JP); Keisuke Yamada, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 397 days.

(21) Appl. No.: 18/549,089

(22) PCT Filed: Mar. 11, 2022

(86) PCT No.: PCT/JP2022/010947

§ 371 (c)(1),
(2) Date: Sep. 5, 2023

(87) PCT Pub. No.: WO2022/191319

PCT Pub. Date: Sep. 15, 2022

(65) Prior Publication Data

US 2024/0168209 A1 May 23, 2024

(30) Foreign Application Priority Data

Mar. 11, 2021 (JP) ................................ 2021-039005

(51) Int. Cl.
*G02B 5/20* (2006.01)
*B82Y 20/00* (2011.01)
*G02B 1/04* (2006.01)

(52) U.S. Cl.
CPC .............. *G02B 5/208* (2013.01); *B82Y 20/00* (2013.01); *G02B 1/04* (2013.01); *G02B 5/206* (2013.01); *G02B 2207/101* (2013.01)

(58) Field of Classification Search
CPC .......... G02B 5/208; G02B 5/206; G02B 5/22; G02B 5/223; G02B 1/04; G02B 1/111; G02B 1/12; G02B 1/14
(Continued)

(56) References Cited

U.S. PATENT DOCUMENTS

2006/0257760 A1* 11/2006 Mori ..................... G03F 7/2041 430/7
2013/0279001 A1* 10/2013 Mochizuki ............ H10F 77/413 359/361
(Continued)

FOREIGN PATENT DOCUMENTS

JP 2006-159853 6/2006
JP 2008-165040 7/2008
(Continued)

*Primary Examiner* — Bumsuk Won
*Assistant Examiner* — Seth D Moser
(74) *Attorney, Agent, or Firm* — HSML P.C.

(57) ABSTRACT

The present disclosure provides a stacked body for a display device comprising a substrate layer; and a functional layer, wherein the functional layer includes a resin, an organic based ultraviolet absorber, and an inorganic based ultraviolet absorber, and when a transmitted yellowness measured by a colorimetry method not using an integrating sphere is regarded as a first transmitted yellowness, and a transmitted yellowness measured by a colorimetry method using an integrating sphere is regarded as a second transmitted yellowness, a value obtained by subtracting the second transmitted yellowness of the stacked body for a display device from the first transmitted yellowness of the stacked body for a display device is 0.4 or more.

18 Claims, 4 Drawing Sheets

(58) Field of Classification Search
USPC .......................................................... 359/359
See application file for complete search history.

(56) References Cited

U.S. PATENT DOCUMENTS

| | | | | |
|---|---|---|---|---|
| 2018/0002486 | A1 | 1/2018 | Klm et al. | |
| 2020/0095414 | A1* | 3/2020 | Shimizu | C09D 133/14 |
| 2020/0108588 | A1* | 4/2020 | Jeon | G02B 1/14 |
| 2022/0282113 | A1* | 9/2022 | Yun | C08J 7/043 |
| 2025/0321361 | A1* | 10/2025 | Sato | G02B 1/115 |

FOREIGN PATENT DOCUMENTS

| | | |
|---|---|---|
| JP | 2010-099835 | 5/2010 |
| JP | 2012-208169 | 10/2012 |
| JP | 2017-194687 | 10/2017 |
| JP | 2018-506611 | 3/2018 |
| JP | 2018-103392 | 7/2018 |
| JP | 2018-104682 | 7/2018 |
| JP | 2018-203989 | 12/2018 |
| JP | 2019-132930 | 8/2019 |
| TW | 202108661 | 3/2021 |
| WO | 2018/070523 | 4/2018 |

* cited by examiner

STACKED BODY FOR DISPLAY DEVICE AND DISPLAY DEVICE

TECHNICAL FIELD

The present disclosure relates to a stacked body for a display device, and a display device using the same.

BACKGROUND ART

For example, a stacked body provided with a functional layer having various properties such as a hard coating property, a scratch resistance, antireflection property, an antiglare property, an antistatic property, and an antifouling property, is placed on the surface of a display device.

By the way, various resin films having transparency are used for display devices. Light resistance is one of the problems of resin films used in display devices. Since many resin films discolor or deteriorate due to the influence of light such as ultraviolet rays, the development of technologies to improve light resistance is underway.

For example, impartation of the light resistance to the stacked body placed on the surface of display devices is being considered (see Patent Documents 1 and 2 for example).

For example, the addition of ultraviolet absorbers is known as a light resistance imparting technology. The ultraviolet absorbers are roughly classified into organic based ultraviolet absorbers, and inorganic based ultraviolet absorbers. Among them, the organic based ultraviolet absorbers have a high degree of freedom in the selection of absorption wavelengths by the structural design of the absorbers, and various organic based ultraviolet absorbers are being studied.

CITATION LIST

Patent Documents

Patent Document 1: Japanese Patent Application Laid-Open (JP-A) No. 2018-203989

Patent Document 2: JP-A No. 2018-103392

SUMMARY OF DISCLOSURE

Technical Problem

However, although adding an organic ultraviolet absorber to the functional layer of the stacked body may give light resistance, there is a problem that increasing the added amount of the organic based ultraviolet absorber in order to improve light resistance results in lower surface hardness.

The present disclosure has been made in view of the above circumstances, and a main object of the present disclosure is to provide a stacked body for a display device and a display device capable of achieving both light resistance and surface hardness at a high level.

Solution to Problem

One embodiment of the present disclosure provides a stacked body for a display device comprising a substrate layer; and a functional layer, wherein the functional layer includes a resin, an organic based ultraviolet absorber, and an inorganic based ultraviolet absorber; and when a transmitted yellowness measured by a colorimetry method not using an integrating sphere is regarded as a first transmitted yellowness, and a transmitted yellowness measured by a colorimetry method using an integrating sphere is regarded as a second transmitted yellowness, a value obtained by subtracting the second transmitted yellowness of the stacked body for a display device from the first transmitted yellowness of the stacked body for a display device is 0.4 or more.

Also, in the stacked body for a display device in the present disclosure, an average particle size of the inorganic based ultraviolet absorber is preferably 10 nm or more and 100 nm or less.

Also, in the stacked body for a display device in the present disclosure, the inorganic based ultraviolet absorber is preferably unevenly distributed on a surface of the functional layer, on an opposite side surface to the substrate layer. In this case, when a content of the inorganic based ultraviolet absorber in the functional layer is 100% by mass, a content of the inorganic based ultraviolet absorber included in a portion from a surface of the functional layer, on an opposite side surface to the substrate layer, to a position half a thickness of the functional layer is preferably 50% by mass or more.

Further, in the present disclosure, the organic based ultraviolet absorber is preferably evenly distributed in the functional layer.

Also, in the stacked body for a display device in the present disclosure, the functional layer preferably incudes an inorganic particle. In this case, the inorganic particle is preferably included in the functional layer more than the inorganic based ultraviolet absorber, on a mass basis. Specifically, a mass ratio of the inorganic based ultraviolet absorber and the inorganic particle is preferably 1:99 to 10:90.

Also, in the stacked body for a display device in the present disclosure, the functional layer preferably includes a color conditioner.

Also, in the stacked body for a display device in the present disclosure, the substrate is preferably a resin substrate. In this case, the resin substrate preferably includes polyimide based resin.

Also, in the stacked body for a display device in the present disclosure, an impact absorbing layer is preferably included on the substrate layer, on an opposite surface side to the functional layer, or between the substrate layer and the functional layer.

Also, in the stacked body for a display device in the present disclosure, an adhesive layer for adhesion is preferably included on the substrate layer, on an opposite surface side to the functional layer.

Also, a second functional layer is preferably included on the functional layer, on an opposite surface side to the substrate layer. The second functional layer may be included on the substrate layer, on an opposite surface side to the functional layer, and may be a multilayer.

Another embodiment of the present disclosure provides a display device comprising: a display panel, and the stacked body for a display device described above placed on an observer side of the display panel.

Advantageous Effects of Disclosure

The present disclosure has an effect that a stacked body for a display device and a display device capable of achieving both light resistance and surface hardness at a high level may be provided.

DESCRIPTION OF EMBODIMENTS

Embodiments in the present disclosure are hereinafter explained with reference to, for example, drawings. However, the present disclosure is enforceable in a variety of different forms, and thus should not be taken as is limited to the contents described in the embodiments exemplified as below. Also, the drawings may show the features of the present disclosure such as width, thickness, and shape of each part schematically comparing to the actual form in order to explain the present disclosure more clearly in some cases; however, it is merely an example, and thus does not limit the interpretation of the present disclosure. Also, in the present description and each drawing, for the factor same as that described in the figure already explained, the same reference sign is indicated and the detailed explanation thereof may be omitted.

In the present descriptions, in expressing an aspect wherein some member is placed on the other member, when described as merely “on” or “below”, unless otherwise stated, it includes both of the following cases: a case wherein some member is placed directly on or directly below the other member so as to be in contact with the other member, and a case wherein some member is placed on the upper side or the lower side of the other member via yet another member. Also, in the present descriptions, on the occasion of expressing an aspect wherein some member is placed on the surface of the other member, when described as merely “on the surface side” or “on the surface”, unless otherwise stated, it includes both of the following cases: a case wherein some member is placed directly on or directly below the other member so as to be in contact with the other member, and a case wherein some member is placed on the upper side or the lower side of the other member via yet another member.

A stacked body for a display device and a display device in the present disclosure are hereinafter described in detail.

A. Stacked Body for a Display Device

The stacked body for a display device in the present disclosure comprises a substrate layer; and a functional layer, wherein the functional layer includes a resin, an organic based ultraviolet absorber, and an inorganic based ultraviolet absorber; and when a transmitted yellowness measured by a colorimetry method not using an integrating sphere is regarded as a first transmitted yellowness, and a transmitted yellowness measured by a colorimetry method using an integrating sphere is regarded as a second transmitted yellowness, a value obtained by subtracting the second transmitted yellowness of the stacked body for a display device from the first transmitted yellowness of the stacked body for a display device is 0.4 or more.

Figure 1:
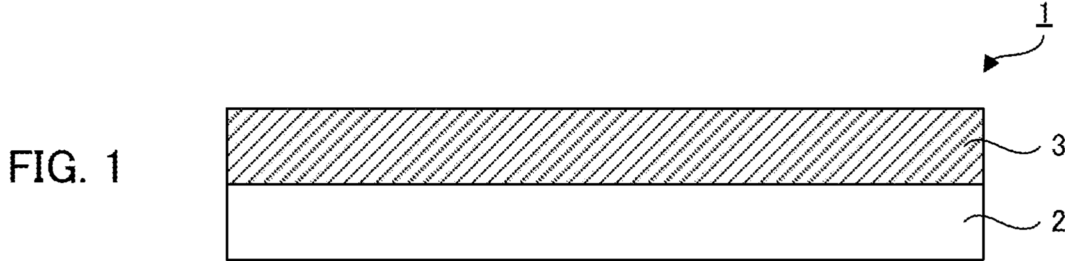
FIG. 1 is a schematic cross-sectional view illustrating an example of a stacked body for a display device in the present disclosure.

FIG. 1 is a schematic cross-sectional view illustrating an example of a stacked body for a display device in the present disclosure. As shown in FIG. 1, stacked body for a display device 1 comprises a substrate layer 2, and a functional layer 3 including a resin, an organic based ultraviolet absorber, and an inorganic based ultraviolet absorber. Also, when a transmitted yellowness measured by a colorimetry method not using an integrating sphere is regarded as a first transmitted yellowness, and a transmitted yellowness measured by a colorimetry method using an integrating sphere is regarded as a second transmitted yellowness, a value obtained by subtracting the second transmitted yellowness of the stacked body for a display device 1 from the first transmitted yellowness of the stacked body for a display device 1 is a predetermined value or more.

In the present disclosure, since the functional layer includes a resin, an organic based ultraviolet absorber, and an inorganic based ultraviolet absorber, and since many inorganic based ultraviolet absorbers have relatively large refractive index differences with resin components, in addition to absorbing ultraviolet rays by the organic based ultraviolet absorber and the inorganic based ultraviolet absorber, ultraviolet rays may be scattered by the inorganic based ultraviolet absorber. Thus, the ultraviolet blocking property of the functional layer may be improved.

Here, the yellowness is a degree to which the hue departs from colorless or white toward yellow direction. The yellowness is usually a positive value, and a negative value indicates that the hue is blue. Therefore, when the transmitted yellowness is high, it means that the transmitted light includes more yellow light components and less blue light components, and when the transmitted yellowness is low, it means that the transmitted light includes less yellow light components and more blue light components.

Also, in the present disclosure, the first transmitted yellowness is a transmitted yellowness measured by a colorimetry method not using an integrating sphere. When the integrating sphere is not used, the yellowness of the transmitted light that does not include scattered light that does not reach the detector is measured, that is, the yellowness of the straight transmission component is mainly measured among the total transmitted light. Meanwhile, the second transmitted yellowness is a transmitted yellowness measured by a colorimetry method using an integrating sphere. When measuring by using the integrating sphere and the stacked body close to the entrance window portion of the integrating sphere, it is possible to measure the yellowness of all transmitted light, including the scattered light, that is, the yellowness of all transmitted light, including the straight transmission component and diffused transmission component, may be measured.

Therefore, the value obtained by subtracting the second transmitted yellowness, measured by a colorimetry method using an integrating sphere, from the first transmitted yellowness measured by a colorimetry method not using an integrating sphere corresponds to a value obtained by subtracting the transmitted yellowness of all transmitted light, including the straight transmission component and diffused transmission component, from the transmitted yellowness of the straight transmission component among the total transmitted light.

Therefore, the value obtained by subtracting the second transmitted yellowness from the first transmitted yellowness may be used as an indicator of the percentage of the blue light component included in the diffused transmission component among the total transmitted light. In other words, the value obtained by subtracting the second transmitted yellowness from the first transmitted yellowness may be used as an indicator of the degree of scattering of the blue light component. When the value obtained by subtracting the second transmitted yellowness from the first transmitted yellowness is high, the proportion of the blue light component included in the diffused transmission component is high, and the degree of scattering of the blue light component is high. Meanwhile, when the value obtained by subtracting the second transmitted yellowness from the first transmitted yellowness is low, the proportion of the blue light component included in the diffused transmission component is low, and the degree of scattering of the blue light component is low.

In the present disclosure, since the value obtained by subtracting the second transmitted yellowness from the first transmitted yellowness is the predetermined value or more, the blue light component included in the diffused transmission component is high, and the degree of scattering of the blue light component is high.

Here, in Rayleigh scattering, the shorter the wavelength, the stronger the scattering. Therefore, when the degree of scattering of the blue light component is high, the degree of scattering of the ultraviolet light component, which has a shorter wavelength than that of the blue light component, is high. Also, in Rayleigh scattering, the strength of forward scattering and backscattering are in the same range. Therefore, in the transmitted light, when the degree of scattering of the blue light component is high and the degree of scattering of the ultraviolet light component adjacent to the blue light component is high, it may be said that the ultraviolet light component is also scattered backwards strongly.

In the present disclosure, since the functional layer includes a resin, an organic based ultraviolet absorber, and an inorganic based ultraviolet absorber, ultraviolet rays may be scattered by the inorganic based ultraviolet absorber, as described above. Therefore, when the value obtained by subtracting the second transmitted yellowness from the first transmitted yellowness is the predetermined value or more, the degree of scattering of ultraviolet rays by the inorganic based ultraviolet absorber is high, and the straight transmission component of ultraviolet rays is reduced. Also, when the degree of scattering of ultraviolet rays by the inorganic based ultraviolet absorber is high, the ultraviolet rays are also scattered backwards strongly. Further, a part of the ultraviolet rays scattered forward by the inorganic based ultraviolet absorber is absorbed by the organic based ultraviolet absorber. Thereby, the transmission of ultraviolet rays may be reduced. Therefore, in the present disclosure, since the value obtained by subtracting the second transmitted yellowness from the first transmitted yellowness is the predetermined value or more, the ultraviolet blocking property of the functional layer may be improved. Therefore, in a display device including a substrate layer that constitutes a stacked body for a display device or a stacked body for a display device, a discolorment and a deterioration, due to ultraviolet rays, of the member placed on the display panel side of the stacked body for a display device may be suppressed, and high light resistance may be obtained.

Also, when only the organic based ultraviolet absorbers are used, the surface hardness is deteriorated if the content of the organic based ultraviolet absorber is increased in order to improve the light resistance. However, in the present disclosure, since the organic based ultraviolet absorber and the inorganic based ultraviolet absorber are used together, the light resistance may be improved while maintaining high surface hardness. Therefore, in the present disclosure, it is capable of achieving both light resistance and surface hardness at a high level.

Each constitution of the stacked body for a display device in the present disclosure is hereinafter described.

1. Properties of Stacked Body for Display Device

In the present disclosure, when a transmitted yellowness measured by a colorimetry method not using an integrating sphere is regarded as a first transmitted yellowness, and a transmitted yellowness measured by a colorimetry method using an integrating sphere is regarded as a second transmitted yellowness, a value obtained by subtracting the second transmitted yellowness of the stacked body for a display device from the first transmitted yellowness of the stacked body for a display device is 0.4 or more, preferably 0.5 or more, and more preferably 0.6. When the value obtained by subtracting the second transmitted yellowness from the first transmitted yellowness is too low, as described above, the degree of scattering of the blue light component is reduced, and the ultraviolet blocking effect of the organic based ultraviolet absorber and the inorganic based ultraviolet absorber may be reduced. Also, the value obtained by subtracting the second transmitted yellowness from the first transmitted yellowness, for example, is preferably 5 or less, more preferably 4.5 or less, and further preferably 4 or less. When the value obtained by subtracting the second transmitted yellowness from the first transmitted yellowness is too high, as described above, the degree of scattering of the blue light component is increased. Therefore, although the ultraviolet blocking effect of the organic based ultraviolet absorber and the inorganic based ultraviolet absorber may be increased, the transmitted yellowness of the stacked body for a display device is increased too much so that the yellowness may be noticeable.

Also, the first transmitted yellowness of the stacked body for a display device is not particularly limited as long as the value obtained by subtracting the second transmitted yellowness from the first transmitted yellowness may be in the predetermined range, and for example, is preferably 10 or less, more preferably 9 or less, and further preferably 8 or less. When the first transmitted yellowness of the stacked body for a display device is low as in the above range, the yellowness may be suppressed and the transparency may be improved.

Also, the second transmitted yellowness of the stacked body for a display device is not particularly limited as long as the value obtained by subtracting the second transmitted yellowness from the first transmitted yellowness may be in the predetermined range, and for example, is preferably 5 or less, more preferably 4 or less, and further preferably 3 or less. When the second transmitted yellowness of the stacked body for a display device is low as in the above range, the yellowness may be suppressed and the transparency may be improved.

Here, the measurement of transmitted yellowness by the colorimetry method not using the integrating sphere is carried out by the following procedure. The optical system of the spectrophotometer is an optical system not via an integrating sphere which divides the light from the light source into the light flux on the control side and the light flux on the sample side, and makes them enter into the detector separately. Firstly, the stacked body cut into a size of 50 mm×50 mm is placed on the film holder for the luminous flux on the sample side of the spectrophotometer so that the functional layer side surface is on the light source side. The stacked body should be free from flaws (contamination), cracks, wrinkles and smudges, and held on the spectrophotometer in a flat, curl-free state. Under this situation, the transmittance is measured under the measurement conditions of at least two points for each 1 nm back and forth between wavelength of 300 nm or more and 780 nm or less, and the transmitted yellowness measured by a colorimetry method not using an integrating sphere is determined from the tristimulus values in the XYZ color system, according to JIS K7373:2006. For example, a "UV-2600" from Shimadzu Corporation may be used as a spectrophotometer.

(Measurement Conditions)

Wavelength range: 300 nm or more and 780 nm or less
Scan speed: fast
Slit width: 5.0 nm
Sampling interval: 0.5 nm interval
Illumination: C
Light source: D2 and WI
Switching wavelength of light source: 360 nm
S/R switch: standard
Auto Zero: carried out at 550 nm after baseline scan Also, the measurement of the transmitted yellowness by a colorimetry method using an integrating sphere is carried out by the following procedure. The optical system of the spectrophotometer is an optical system via an integrating sphere wherein the light from the light source is divided into the light flux on the control side and the light flux on the sample side, they are entered into the integrating sphere separately, and detected by a detector. Firstly, the stacked body cut into a size of 50 mm×50 mm is placed on the film holder of the entrance window portion of the integrating sphere for the luminous flux on the sample side of the spectrophotometer so that the functional layer side surface is on the light source side. The stacked body should be free from flaws (contamination), cracks, wrinkles and smudges, and held on the spectrophotometer in a flat, curl-free state. Under this situation, the transmittance is measured under the measurement conditions of at least two points for each 1 nm back and forth between wavelength of 300 nm or more and 780 nm or less, and the transmitted yellowness measured by a colorimetry method using an integrating sphere is determined from the tristimulus values in the XYZ color system, according to JIS K7373:2006. For example, a "UV-2600" from Shimadzu Corporation may be used as a spectrophotometer.

(Measurement Conditions)

Wavelength range: 300 nm or more and 780 nm or less
Scan speed: fast
Slit width: 5.0 nm
Sampling interval: 0.5 nm interval
Illumination: C
Light source: D2 and WI
Switching wavelength of light source: 360 nm
S/R switch: standard
Auto Zero: carried out at 550 nm after baseline scan Also, in the present disclosure, the difference of the transmitted yellowness before and after a light resistance test of the stacked body for a display device, that is, the yellowing degree is, for example, preferably 4 or less, more preferably 3 or less, and further preferably 2 or less. When the yellowing degree of the stacked body for a display device is in the above range, excellent light resistance may be obtained.

Here, the light resistance test is carried out by the following procedure. A xenon light resistance tester is used for the light resistance test. Firstly, the stacked body cut into a size of 135 mm×60 mm is placed on the film holder of the xenon light resistance tester so that the functional layer side surface is on the light source side. The stacked body should be free from flaws (contamination), cracks, wrinkles and smudges, and held on the xenon light resistance tester in a flat, curl-free state. Then, the sample is exposed under the conditions of irradiance of 60 $W/m^2$, wavelength of 300 nm or more and 400 nm or less, and 50 °C 50% RH for 24 hours. For example, a "Ci4000" from Atlas Material Testing Technology may be used as a xenon light resistance tester.

Also, a method for measuring a transmitted yellowness before and after the light resistance test of the stacked body for a display device may be similar to that of the method for measuring a transmitted yellowness measured by a colorimetry method not using an integrating sphere described above.

Also, in the present disclosure, the pencil hardness of the functional layer side surface of the stacked body for a display device is, for example, preferably 3H or more, more preferably 4H or more, and further preferably 5H or more. When the pencil hardness is in the above range, the hardness of the functional layer side surface of the stacked body for a display device may be increased so that the chafing resistance and abrasion resistance may be improved.

Here, the pencil hardness is measured by the pencil hardness test specified by JIS K5600-5-4 (1999). Specifically, using a pencil for the test specified by JIS-S-6006, the pencil hardness test specified by JIS K5600-5-4 (1999) is carried out to the functional layer side surface of the stacked body for a display device, and the pencil hardness may be determined by evaluating the highest pencil hardness at which the sample is not bruised. The measurement conditions may be angle of 45°, load of 750 g, testing rate of 0.5 mm/sec or more and 1 mm/sec or less, and temperature of 23±2 °C. As the pencil hardness tester, for example, a pencil scratch hardness tester from Toyo Seiki Seisaku-sho, Ltd. may be used. Incidentally, when measuring the pencil hardness, a plurality of pencils having different hardness are used. The pencil hardness test is carried out for 5 times for one pencil, and when the surface of the stacked body is not bruised for 4 times or more out of 5 times, the surface of the stacked body is determined as not bruised by the pencil with that hardness. The bruise is referred to as a white bruise which is visible when the surface of the stacked body after the pencil hardness test is transmissively observed under a fluorescent light.

The total light transmittance of the stacked body for a display device in the present disclosure is preferably, for example, 85% or more, more preferably 88% or more, and further preferably 90% or more. When the total light transmittance is high as described above, the stacked body for a display device may have good transparency.

Here, the total light transmittance of the stacked body for a display device may be measured according to JIS K7361-1, and may be measure with, for example, a haze meter HM150 from Murakami Color Research Laboratory Co., Ltd.

The haze of the stacked body for a display device in the present disclosure is preferably, for example, 5% or less, more preferably 2% or less, and further preferably 1% or less. When the haze is low as described above, the stacked body for a display device may have good transparency.

Here, the haze of the stacked body for a display device may be measured according to JIS K-7136, and may be measure with, for example, a haze meter HM150 from Murakami Color Research Laboratory Co., Ltd.

The stacked body for a display device in the present disclosure preferably has a bending resistance. When the stacked body for a display device has a bending resistance, it is applicable to a flexible display. In a flexible display, when a discolorment or a deterioration due to ultraviolet occurs to the substrate layer of the stacked body for a display device or a member placed on the display panel side of the stacked body for a display device, the visibility tends to be deteriorated particularly at the bent portion. In the stacked body for a display device in the present disclosure, since high light resistance may be obtained, the deterioration of the visibility at the bent portion may be suppressed so that it is preferable for a flexible display.

Specifically, when the dynamic bending test described below is carried out to the stacked body for a display device, it is preferable that a crack or a fracture does not occur in the stacked body for a display device.

Figure 2A:
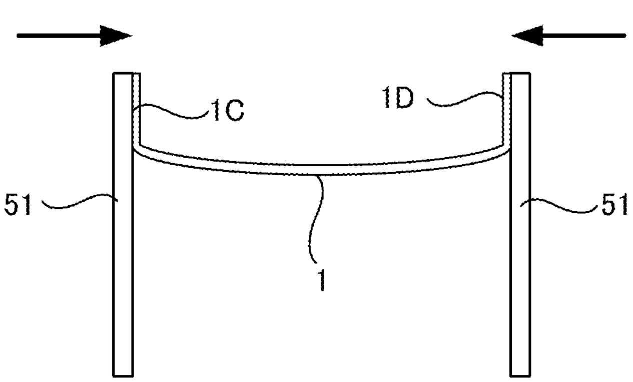
FIGS. 2A to 2C are schematic views explaining a dynamic bending test.
Figure 2B:
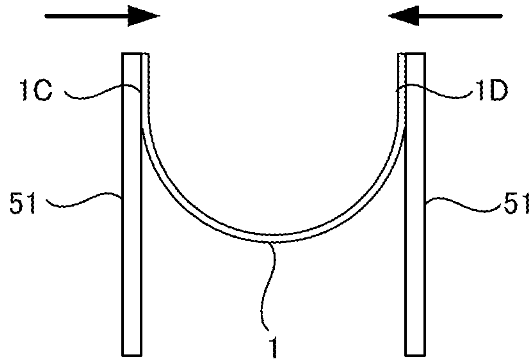
Figure 2C:
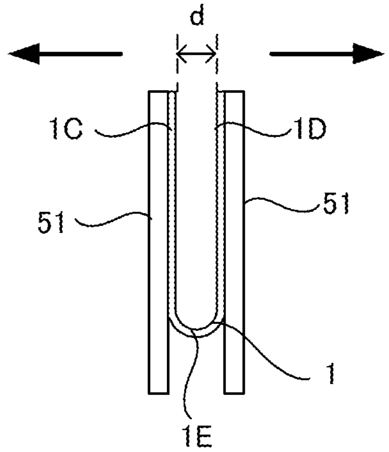

The dynamic bending test is carried out as follows. Firstly, a stacked body for a display device having a size of 20 mm×100 mm is prepared. Then, in the dynamic bending test, as shown in FIG. 2A, short side portion 1C and short side portion 1D opposing to the short side portion 1C of the stacked body for a display device 1 are respectively fixed by parallelly arranged fixing portions 51. Also, as shown in FIG. 2A, the fixing portions 51 are movable by sliding in horizontal direction. Then, as shown in FIG. 2B, by moving the fixing portions 51 so as to be closer to each other, the stacked body for a display device 1 is deformed so as to be folded. Further, as shown in FIG. 2C, after moving the fixing portions 51 to the position wherein distance "d" between the two opposing short side portions 1C and 1D of the stacked body for a display device 1 fixed by the fixing portions 51 is a predetermined value, the deformation of the stacked body for a display device 1 is dissolved by moving the fixing portions 51 in opposite directions. As shown in FIGS. 2A to 2C, by moving the fixing portions 51, the stacked body for a display device 1 may be folded into 180°. Also, by carrying out the dynamic bending test so that bent portion 1E of the stacked body for a display device 1 does not protrude from the lower end edge of the fixing portions 51, and by controlling the distance when the fixing portions 51 are the closest, distance "d" between the two opposing short side portions 1C and 1D of the stacked body for a display device 1 may be the predetermined value. For example, when the distance "d" between the short side portions 1C and 1D is 30 mm, the outer diameter of the bent portion 1E is regarded as 30 mm.

In the stacked body for a display device, it is preferable that a crack or a fracture does not occur when the dynamic bending test wherein the stacked body for a display device 1 is folded into 180° so that the distance "d" between the opposing short side portions 1C and 1D of the stacked body for a display device 1 is 30 mm, is carried out repeatedly for 200,000 times, and it is more preferable that a crack or a fracture does not occur when the dynamic bending test is carried out repeatedly for 500,000 times. Among the above, it is preferable that a crack or a fracture does not occur when the dynamic bending test wherein the stacked body for a display device is folded into 180° so that the distance "d" between the opposing short side portions 1C and 1D of the stacked body for a display device is 20 mm, is carried out repeatedly for 200,000 times; particularly, it is preferable that a crack or a fracture does not occur when the dynamic bending test wherein the stacked body for a display device 1 is folded into 180° so that the distance "d" between the opposing short side portions 1C and 1D of the stacked body for a display device 1 is 10 mm, is carried out repeatedly for 200,000 times.

In the dynamic bending test, the stacked body for a display device may be folded so that the functional layer is on the outer side, or the stacked body for a display device may be folded so that the functional layer is on the inner side; and in either of these cases, it is preferable that a crack or a fracture does not occur in the stacked body for a display device.

2. Functional Layer

The functional layer in the present disclosure is a layer placed on one surface side of the substrate layer, and including a resin, an organic based ultraviolet absorber, and an inorganic based ultraviolet absorber. Since the functional layer includes the organic based ultraviolet absorber and the inorganic based ultraviolet absorber, a discolorment and a deterioration, due to ultraviolet ray, of the substrate layer of the stacked body for a display device or the member placed on the display panel side than the stacked body for a display device in a display device including the stacked body for a display device may be suppressed.

(1) Material of Functional Layer

The functional layer includes a resin, an organic based ultraviolet absorber, and an inorganic based ultraviolet absorber. Also, the resin layer may include an inorganic particle, or a color conditioner, if necessary.

(a) Organic Based Ultraviolet Absorber

The organic based ultraviolet absorber is not particularly limited, and examples thereof may include a benzotriazole based ultraviolet absorber, a benzophenone based ultraviolet absorber, a triazine based ultraviolet absorber, a cyanoacrylate based ultraviolet absorber, a hinderedamine based ultraviolet absorber, a benzoate based ultraviolet absorber, a malonate ester based ultraviolet absorber, and an anilide oxalate based ultraviolet absorber. One type of the organic based ultraviolet absorber may be used alone, and two types or more may be mixed and used. Also, commercially available products may be used as the organic based ultraviolet absorber.

Among them, the organic based ultraviolet absorber is preferably a benzotriazole based ultraviolet absorber, a benzophenone based ultraviolet absorber, and a triazine based ultraviolet absorber. Particularly, from the viewpoint of transmittance, ultraviolet absorption, and reduction of the yellowness, a benzotriazole based ultraviolet absorber, a triazine based ultraviolet absorber, and a benzotriazole based ultraviolet absorber are more preferable.

Examples of the benzotriazole based ultraviolet absorber may include 2-(2'-hydroxy-5'-methylphenyl)benzotriazole, 2-(2'-hydroxy-3'-tert-butyl-5'-methylphenyl)-5-chlorobenzotriazole, 2-(2'-hydroxy-3',5'-di-tert-aminophenyl)benzotriazole, 2-(2'-hydroxy-5'-tert-octylphenyl)benzotriazole, 2,2'-methylenebis[6-(2H-benzotriazole-2-yl)-4-tert-octylphenol], 2-(2H-benzotriazole-2-yl)-4-(1,1,3,3-tetramethylbutyl)phenol, 2-(2'-hydroxy-5'-tert-butylphenyl)-2H-benzotriazole, 2-(2H-benzotriazole-2-yl)-4,6-bis(1-methyl-1-phenylethyl)phenol, 2-(2H-benzotriazole-2-yl)-6-(1-methyl-1-phenylethyl)-4-(1,1,3,3-tetramethylbutyl)phenol, 2,2'-methylenebis[4-(1,1,3,3-tetramethylbutyl)-6-(2H-benzotriazole-2-yl)phenol], 2-(3,5-di-tert-butyl-2-hydroxyphenyl)-5-chlorobenzotriazole, 2-(2H-benzotriazole-2-yl)-p-cresol, 2-(2H-benzotriazole-2-yl)-4,6-bis(1-methyl-1-phenylethyl)phenol, 2-benzotriazole-2-yl)-4,6-di-tert-butylphenol, 2-[5-chloro(2H)-benzotriazole-2-yl]-4-methyl-6-(tert-butyl)phenol, 2-(2H-benzotriazole-2-yl)-4,6-di-tert-butylphenol, 2-(2H-benzotriazole-2-yl)-4-(1,1,3,3-tetramethylbutyl)phenol, 2-(2H-benzotriazole-2-yl)-4-methyl-6-(3,4,5,6-tetrahydrophthalimidylmethyl)phenol, a reaction product of methyl 3-(3-(2H-benzotriazole-2-yl)-5-tert-butyl-4-hydroxyphenyl)propionate/polyethylene glycol 300, and 2-(2H-benzotriazole-2-yl)-6-(linear chain and side chain dodecyl)-4-methylphenol.

Examples of the benzophenone based ultraviolet absorber may include 2-hydroxy-4-n-octoxybenzophenone, 2,4-dihydroxybenzophenone, 2-hydroxy-4-methoxybenzophenone, 4-dodecyloxy-2-hydroxybenzophenone, 4-benzyloxy-2-hydroxybenzophenone, 2,2',4,4'-tetrahydroxybenzophenone, 2,2'-dihydroxy-4,4'-dimethoxybenzophenone, and 1,4-bis (4-benzoyl-3-hydroxyphenoxy)-butane.

Examples of the triazine based ultraviolet absorber may include 2-(4,6-diphenyl-1,3,5-triazine-2-yl)-5-[(hexyl)oxy]-phenol, 2-(4,6-bis(2,4-dimethylphenyl)-1,3,5-triazine-2-yl) 5-hydroxyphenyl, 2,4-bis[2-hydroxy-4-butoxyphenyl]-6-(2, 4-dibutoxyphenyl)-1,3,5-triazine, 2-(4,6-diphenyl-1,3,5-triazine-2-yl)-5-[2-(2-ethylhexanoyloxy) ethoxy]phenol, and 2,4,6-tris(2-hydroxy-4-hexyloxy-3-methylphenyl)-1,3, 5-triazine.

The content of the organic based ultraviolet absorber is, for example, preferably 0.5 parts by mass or more and 5 parts by mass or less, more preferably 1 part by mass or more and 4.5 parts by mass or less, and further preferably 1.5 parts by mass or more and 4 parts by mass or less, with respect to 100 parts by mass of the resin component. When the content of the organic based ultraviolet absorber is too low, the desired light resistance may not be obtained. Also, when the content of the organic based ultraviolet absorber is too high, the surface hardness of the functional layer may decrease.

The organic based ultraviolet absorber used in the present disclosure is preferably evenly distributed in the functional layer. In the functional layer in the present disclosure, the ultraviolet ray absorbing property is obtained effectively with a small amount of the ultraviolet absorber by absorbing the ultraviolet ray, scattered by the inorganic based ultraviolet absorber described later, with the organic based ultraviolet absorber. When the organic based ultraviolet absorber is evenly distributed in the functional layer, the ultraviolet absorbing property may further be improved.

In the present disclosure, the situation wherein the organic based ultraviolet absorber being evenly distributed in the functional layer is referred to as follows. In other words, the functional layer is divided into 10 parts in the depth direction, and the peak intensity of the organic based ultraviolet absorber is measured in each divided part. The average value of the peak intensities measured in the 10 locations described above is calculated. Using the calculated average value as 1, the ratio of the peak intensity in each part of the 10 locations with respect to the calculated average value is calculated. When the calculated ratio of each part is 0.6 or more and 1.4 or less, this situation is regarded as the situation wherein the organic based ultraviolet absorber being evenly distributed in the functional layer.

The peak intensity of the organic based ultraviolet absorber in a predetermined part of the functional layer may be measured by the depth direction analysis of the functional layer using a time of flight secondary ion mass spectrometer (TOF-SIMS).

(b) Inorganic Based Ultraviolet Absorber

The inorganic based ultraviolet absorber is not particularly limited as long as it is capable of absorbing and scattering ultraviolet rays, and examples thereof may include particles of metal oxides such as titanium oxide, zinc oxide, and cerium oxide. Among them, from the viewpoint of transmittance and ultraviolet absorption, titanium oxide and zinc oxide are preferable and titanium oxide is more preferable.

From the viewpoint of weather resistance, the photocatalytic activity of the inorganic based ultraviolet absorber is preferably low. Therefore, the inorganic based ultraviolet absorber is preferably a particle with a surface treatment agent on the surface, in order to suppress the photocatalytic activity. That is, the inorganic based ultraviolet absorber is preferably a particle of metal oxide with a surface treatment agent on the surface.

Examples of the surface treatment agents may include metal hydrous oxides, coupling agents, and oils. Examples of the metal hydrated oxides may include alumina, silica, titania, zirconia, tin oxide, antimony oxide, and zinc oxide. Also, examples of the coupling agents may include silane coupling agents, titanate coupling agents, and aluminum coupling agents. Examples of the oils may include silicone oil and fluorine based oil.

Also, the inorganic based ultraviolet absorber may be, for example, a particle whose surface is treated with metal hydrous oxides, coupling agents or oils, and alternatively; it may be a particle whose surface is treated with metal hydrous oxides, and further, surface treated with the coupling agents or oils.

The average particle size of the inorganic based ultraviolet absorber is not particularly limited as long as it is capable of absorbing and scattering ultraviolet rays, and for example, preferably 10 nm or more and 100 nm or less, more preferably 20 nm or more and 90 nm or less, and further more preferably 30 nm or more and 70 nm or less. When the average particle size of the inorganic based ultraviolet absorber is too low, the scattering light intensity is decreased so that the sufficient ultraviolet blocking property may not be obtained. Also, when the average particle size of an inorganic ultraviolet absorber is too high, the haze of the stacked body for a display device will be high and transparency may be impaired.

Here, the average particle size of the inorganic based ultraviolet absorber may be measured by observing the cross-section of the functional layer with an electron microscope such as a transmission electron microscope (TEM) or a scanning transmission electron microscope (STEM), and the average particle size of the inorganic based ultraviolet absorber of arbitrary selected 10 particles is regarded as the average particle size.

Also, the inorganic based ultraviolet absorber is preferably unevenly distributed on a surface of the functional layer, on an opposite side surface to the substrate layer. When the inorganic based ultraviolet absorber is unevenly distributed on a surface of the functional layer, on an opposite side surface to the substrate layer, the density of the inorganic based ultraviolet absorber is high on the surface of the functional layer, on an opposite side surface to the substrate layer, so that ultraviolet rays may be effectively scattered, and the light resistance may be improved. Thereby, light resistance may be exhibited even though the content of the inorganic based ultraviolet absorber and the organic based ultraviolet absorber is low, so that excellent light resistance may be exhibited while maintaining high surface hardness.

In the above case, when the content of the inorganic based ultraviolet absorber in the functional layer is 100% by mass, the content of the inorganic based ultraviolet absorber included in a portion from a surface of the functional layer, on an opposite side surface to the substrate layer, to a position half a thickness of the functional layer is preferably, for example, 50% by mass or more, more preferably 60% by mass or more, and further preferably 70% by mass or more. As described above, light resistance may be increased when the content is in the above range.

Figure 3:
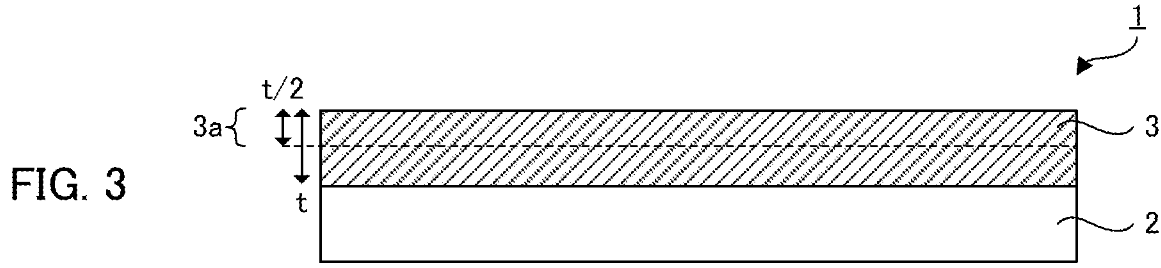
FIG. 3 is a schematic cross-sectional view illustrating an example of a stacked body for a display device in the present disclosure.

Incidentally, the portion from a surface of the functional layer, on an opposite side surface to the substrate layer, to a position half a thickness of the functional layer is referred to as, for example as shown in FIG. 3, the portion 3*a* from the surface of the functional layer 3, on an opposite side surface to the substrate layer 2, to a position half "t/2" a thickness "t" of the functional layer 3.

Here, the content of the inorganic based ultraviolet absorber included in the predetermined portion of the functional layer may be measured by the depth direction analysis of the functional layer using a time of flight secondary ion mass spectrometer (TOF-SIMS). Specifically, the distribution of the inorganic based ultraviolet absorber in the portion from a surface of the functional layer, on an opposite side surface to the substrate layer, to a position half a thickness of the functional layer may be measured from the ratio between the average value of the peak intensity of the inorganic based ultraviolet absorber in the portion from a surface of the functional layer, on an opposite side surface to the substrate layer, to a position half a thickness of the functional layer; and the average value of the peak intensity of the inorganic based ultraviolet absorber in the functional layer as a whole.

Also, examples of the method for unevenly distributing the inorganic based ultraviolet absorber on the surface of the functional layer, on an opposite side surface to the substrate layer may include a method wherein, when the functional layer is a single layer, using a resin composition for a functional layer including a solvent that can dissolve the substrate layer, a coating film is formed by coating the substrate layer with the resin composition for a functional layer, dried by heating at a temperature of 30 °C or more and 90 °C or less for 30 seconds or more and 240 seconds or less, and the coating film is irradiated with ionizing radiation such as ultraviolet rays to form a functional layer. Also, for example, when the functional layer is a multilayer, the inorganic based ultraviolet absorber may be unevenly distributed on the surface of the functional layer, on an opposite side surface to the substrate layer by, among the multilayer functional layer, compounding the inorganic based ultraviolet absorber in the layer located on the surface opposite to the substrate layer, and not compounding the inorganic based ultraviolet absorber in the layer located on the substrate layer side surface.

The content of the inorganic based ultraviolet absorber is, for example, preferably 0.5 parts by mass or more and 10 parts by mass or less, more preferably 0.7 parts by mass or more and 7 parts by mass or less, and further preferably 1 part by mass or more and 5 parts by mass or less, with respect to 100 parts by mass of the resin component. When the content of the inorganic based ultraviolet absorber is too low, the desired light resistance may not be obtained. Also, when the content of the inorganic based ultraviolet absorber is too high, the transparency of the functional layer may be deteriorated, the stability of the resin composition for a functional layer used for the formation of the functional layer may be decreased, and the bending property may be decreased.

(c) Inorganic Particles

The functional layer preferably includes an inorganic particle. Thereby, the hardness of the functional layer may be improved.

Incidentally, in the present descriptions, the inorganic particle is referred to as an inorganic particle other than the inorganic based ultraviolet absorber.

Examples of the inorganic particles may include metal oxide particles such as silica, aluminum oxide, zirconium oxide, germanium oxide, indium oxide, tin oxide, indium tin oxide (ITO), and antimony oxide; metal fluoride particles such as magnesium fluoride and sodium fluoride; metal particles; metal sulfide particles; and metal nitride particles. Among them, metal oxide particles are preferable, and silica particles are preferable from the viewpoint of high hardness.

Also, the inorganic particles are preferably reactive inorganic particles including a reactive functional group on the surface thereof, those undergoes a cross-linking reaction between the inorganic particles or with the polymerizable compound used in the resin, and are capable of forming a covalent bond. By undergoing the cross-linking reaction between the reactive inorganic particles or between the reactive inorganic particle and the polymerizable compound used in the resin, hardness of the functional layer may further be improved.

The reactive inorganic particles include a reactive functional group on the surface thereof. As the reactive functional group, for example, a polymerizable unsaturated group is preferably used, more preferably a photo-curing unsaturated group, and particularly preferably an ionizing radiation curing unsaturated group. Examples of the reactive functional group may include ethylenically unsaturated bonds such as a (meth) acryloyl group, a vinyl group, and an allyl group; and an epoxy group.

When the inorganic particles are silica particles, they are preferably reactive silica particles including a reactive functional group on the surface thereof. The reactive silica particles are not particularly limited, and conventionally known ones may be used, and examples thereof may include reactive silica particles described in, for example, JP-A No. 2008-165040. Also, as the reactive silica particles, commercially available products may be used, and examples thereof may include MIBK-SD, MIBK-SDMS, MIBK-SDL, MIBK-SDZL, all from Nissan Chemical Industry Co., Ltd.; and V8802 and V8803, all from JGC Catalysts and Chemicals Ltd.

Also, although the silica particle may be spherical silica particles, the silica particles are preferably deformed silica particles. The spherical silica particles and the deformed silica particles may be mixed. Since the deformed silica particles have larger surface area compared with the spherical silica particles, by including such deformed silica particles, the contact area with the polymerizable compound used in the resin component, for example, becomes large, so that the hardness of the functional layer may further be improved.

Incidentally, in the present specification, the term deformed silica particle means a silica particle of a shape having random irregularities of potato-like shape on the surface. Also, whether the silica particle is the deformed silica particle, or not may be confirmed by observing the cross-section of the functional layer with an electron microscope.

From the viewpoint of improving hardness, the average particle size of the inorganic particles is, for example, preferably 5 nm or more, and more preferably 10 nm or more. Also, from the viewpoint of transparency, the average particle size of the inorganic particles is, for example, preferably 200 nm or less, more preferably 100 nm or less, and further preferably 50 nm or more.

Here, the average particle size of the inorganic particles may be measured by observing the cross-section of the functional layer with an electron microscope such as a transmission electron microscope (TEM) or a scanning transmission electron microscope (STEM), and the average particle size of the inorganic particles of arbitrary selected 10 particles is regarded as the average particle size. Incidentally, for the deformed silica particles, the average particle size is obtained by measuring the maximum value (major axis) and the minimum value (minor axis) of the distances between two points of the outer periphery of the deformed silica particle by a cross-sectional microscope observation of the functional layer; regarding the average value thereof as the particle size; and the average of the particle size of 10 deformed silica particles is regarded as the average particle size.

For example, the content of the inorganic particles is preferably 25 parts by mass or more and 100 parts by mass or less, with respect to 100 parts by mass of the resin component.

In the present disclosure, the inorganic particles are preferably included more than the inorganic based ultraviolet absorber described above, on a mass basis. Specifically, the inorganic particles are preferably included 2 times or more, and more preferably 3 times or more than the inorganic based ultraviolet absorber, on a mass basis. The transparency of the functional layer may further be improved.

Also, when the inorganic particles are silica particles, the mass ratio of the inorganic based ultraviolet absorber and the silica particles is preferably, for example, 1:99 to 10:90, more preferably 2:98 to 7:93, and further preferably 3:97 to 5:95. When the mass ratio of the inorganic based ultraviolet absorber and the silica particle is in the above range, the bleaching may be suppressed so that both ultraviolet blocking property and hardness may be achieved.

In the present disclosure, the hardness of the functional layer may be controlled by adjusting the particle size and content of the inorganic particles.

(d) Color Conditioner

The functional layer may include a color conditioner to adjust the transmitted yellowness of the stacked body for a display device. Examples of the color conditioner may include blue or purple coloring matter which is a complementary color to yellow. When the functional layer includes the color conditioner, the transmitted yellowness of the stacked body for a display device may be decreased.

The blue or purple coloring matter may be either a pigment and a dye, and preferably one having both light resistance and heat resistance. Also, the pigment may be either an organic pigment or an inorganic pigment. Specific examples of the blue or purple coloring matter may include phthalocyanine pigments and cobalt pigments. Among them, polycyclic pigments are preferable from the viewpoint of light resistance. Compared to the molecular dispersion of dyes, the polycyclic pigments have less degree of molecular fracture due to ultraviolet rays, and are remarkably superior in light resistance. Among the polycyclic pigments, phthalocyanine pigments are preferable. Meanwhile, dyes are preferable from the viewpoint of transparency since the molecules of the dyes are dispersed into solvents.

The content of the color conditioner is appropriately adjusted so that the transmitted yellowness of the stacked body for a display device is in the intended range. For example, the content is preferably 0.1 parts by mass or more and 5 parts by mass or less, with respect to 100 parts by mass of the resin component.

(e) Resin

The resin may be appropriately selected according to the performance to be imparted to the functional layer.

For example, when the functional layer is not required to have a hard coating property, examples of the resin may include at least one kind selected from the group consisting of (meth)acrylic based resins, cellulose based resins, urethane based resins, vinyl chloride based resins, polyester based resins, polyolefin based resins, polycarbonates, nylons, polystyrenes, and ABS resins. Among them, for example, (meth)acrylic based resins, and polyester based resins are preferable from the viewpoint of ease of processing and hardness.

Examples of the (meth)acrylic based resin may include polymethyl methacrylate. Also, examples of the cellulose based resin may include diacetyl cellulose, cellulose acetate propionate (CAP), and cellulose acetate butyrate (CAB). Examples of the urethane based resin may include urethane resins. Examples of the vinyl chloride based resin may include polyvinyl chloride, and a vinyl chloride-vinyl acetate copolymer. Also, examples of the polyester based resin may include polyethylene terephthalate. Also, examples of the polyolefin based resin may include polyethylene, and polypropylene.

Also, for example, when the functional layer has a hard coating property, specific examples of the resin may include a cured product of a polymerizable compound. The cured product of a polymerizable compound may be obtained by carrying out a polymerization reaction of a polymerizable compound, by a known method, using a polymerization initiator according to the needs.

The polymerizable compound includes at least one polymerizable functional group in the molecule. As the polymerizable compound, for example, at least one kind of radical polymerizable compound and cation polymerizable compound may be used.

The radical polymerizable compound is a compound including a radical polymerizable group. The radical polymerizable group included in the radical polymerizable compound may be any functional group capable of generating a radical polymerization reaction, and is not particularly limited; and examples thereof may include a group including a carbon-carbon unsaturated double bond, and specific examples thereof may include a vinyl group and a (meth) acryloyl group. Incidentally, when the radical polymerizable compound includes two or more radical polymerizable groups, these radical polymerizable groups may be the same, and may be different from each other.

The number of radical polymerizable groups included in one molecule of the radical polymerizable compound is preferably two or more, and more preferably three or more, from the viewpoint of increasing the surface hardness of the functional layer so that the chafing resistance is improved.

Among the above, from the viewpoint of high reactivity, the radical polymerizable compound is preferably a compound including a (meth) acryloyl group. For example, a polyfunctional (meth) acrylate monomer and oligomer having a molecular weight of several hundred to several thousand, and including several (meth) acryloyl groups in the molecule may be preferably used; such as those referred to as urethane (meth)acrylate, polyester (meth)acrylate, epoxy (meth)acrylate, melamine (meth) acrylate, polyfluoroalkyl (meth) acrylate, and silicone (meth)acrylate; and a polyfunctional (meth) acrylate polymer including two or more (meth) acryloyl groups on the side chain of an acrylate polymer may also be preferably used. Among the above, a polyfunctional (meth) acrylate monomer including two or more (meth) acryloyl groups in one molecule may be preferably used. By the functional layer including a cured product of the polyfunctional (meth) acrylate monomer, the surface hardness of the functional layer may be increased so that the chafing resistance may be improved. Further, the close adhesiveness may also be improved. Also, a polyfunctional (meth) acrylate oligomer or polymer including two or more (meth) acryloyl groups in one molecule may also be preferably used. By the functional layer including a cured product of the polyfunctional (meth) acrylate oligomer or polymer, the surface hardness of the functional layer may be increased so that the chafing resistance may be improved. Further, the bending resistance and close adhesiveness may also be improved.

Incidentally, in the present specification, (meth) acryloyl represents each of acryloyl and methacryloyl, and (meth) acrylate represents each of acrylate and methacrylate.

Specific examples of the polyfunctional (meth)acrylate monomer may include those described in, for example, JP-A No. 2019-132930. Among them, those having 3 or more and 6 or less (meth)acryloyl groups in one molecule are preferable from the viewpoint of high reactivity, high surface hardness of the functional layer, and improvement of the chafing resistance. As such a polyfunctional (meth)acrylate monomer, for example, pentaerythritol triacrylate (PETA), dipentaerythritol hexaacrylate (DPHA), pentaerythritol tetraacrylate (PETTA), dipentaerythritol pentaacrylate (DPPA), trimethylolpropane tri(meth)acrylate, tripentaerythritol octa(meth)acrylate, and tetrapentaerythritol deca (meth)acrylate may be preferably used. In particular, at least one kind selected from pentaerythritol tri(meth)acrylate, dipentaerythritol penta(meth)acrylate, and dipentaerythritol hexaacrylate is preferable.

Also, when the radical polymerizable compound is used, the chafing resistance may be decreased due to the flexible group in the molecular structure. Therefore, in order to suppress the decrease in the chafing resistance due to the flexible components (soft segments), it is preferable to use a radical polymerizable compound wherein a flexible group is not introduced into the molecular structure. Specifically, it is preferable to use a radical polymerizable compound that is not EO or PO modified. By using such a radical polymerizable compound, the crosslinking point may be increased and the chafing resistance may be improved.

In order to adjust the hardness or viscosity, or to improve the close adhesiveness, the functional layer may include a monofunctional (meth) acrylate monomer as the radical polymerizable compound. Specific examples of the monofunctional (meth) acrylate monomer may include those described in, for example, Japanese Patent Application Laid-Open (JP-A) No. 2019-132930.

The cation polymerizable compound is a compound including a cation polymerizable group. The cation polymerizable group included in the cation polymerizable compound may be a functional group capable of generating a cation polymerization reaction, and is not particularly limited; and examples thereof may include an epoxy group, an oxetanyl group, and a vinyl ether group. Incidentally, when the cation polymerizable compound includes two or more cation polymerizable groups, these cation polymerizable groups may be the same, and may be different from each other.

The number of the cation polymerizable groups included in one molecule of the cation polymerizable compound is preferably two or more, and more preferably three or more, from the viewpoint of increasing the surface hardness of the functional layer so that the chafing resistance is improved.

Also, among the above, as a cation polymerizable compound, a compound including at least one kind of an epoxy group and an oxetanyl group as a cation polymerizable group is preferable, and a compound including two or more of at least one kind of epoxy groups and oxetanyl groups in one molecule is more preferable. A cyclic ether group such as an epoxy group and an oxetanyl group is preferable from the viewpoint that shrinkage associated with the polymerization reaction is small. Also, a compound including the epoxy group, among the cyclic ether groups, has advantages in that compounds having various structures may be easily obtained; the durability of the obtained functional layer is not adversely affected; and the compatibility with the radical polymerizable compound may be easily controlled. Also, the oxetanyl group, among the cyclic ether groups, has advantaged in that the degree of polymerization is high compared with the epoxy group; the toxicity is low; and when the obtained functional layer is combined with a compound including an epoxy group, the network forming rate obtained from the cationic polymerizable compound in the coating film is accelerated, and an independent network is formed without leaving unreacted monomers in the film even in a region mixed with the radical polymerizable compound.

Examples of the cationic polymerizable compound including an epoxy group may include an alicyclic epoxy resins such as polyglycidyl ether of a polyhydric alcohol including an alicyclic ring, or resins obtained by epoxidizing a compound including a cyclohexene ring or a cyclopentene ring, with a suitable oxidizing agent such as hydrogen peroxide and a peracid; an aliphatic epoxy resins such as polyglycidyl ether of aliphatic polyhydric alcohol or alkylene oxide adduct thereof, polyglycidyl ester of aliphatic long-chain polybasic acid, or homopolymer or copolymer of glycidyl (meth)acrylate; a glycidyl ether type epoxy resin such as glycidyl ether produced by the reaction of bisphenols such as bisphenol A, bisphenol F, and hydrogenated bisphenol A, or derivative thereof such as alkylene oxide adduct and caprolactone adduct with epichlorohydrin, and resins that is novolac epoxy resin and derived from bisphenols.

Specific examples of the cationic polymerizable compound including the alicyclic epoxy resin, the glycidyl ether type epoxy resin, and an oxetanyl group may include those described in, for example, JP-A No. 2018-104682.

(f) Additive

The functional layer may include an additive such as an antioxidant, a light stabilizer, an antistatic agent, an antiglare agent, a leveling agent, a surfactant, a filler, an easy lubricant, various sensitizers, a flame retardant, an adhesive imparting agent, a polymerization initiator, a polymerization inhibitor, and a surface modifier, if necessary.

As the polymerization initiator, a radical polymerization initiator, a cation polymerization initiator, and a radical and cation polymerization initiator may be appropriately selected and used. These polymerization initiators are decomposed by at least one kind of light irradiation and heating to generate radicals or cations to cause radical polymerization and cation polymerization to proceed. Incidentally, all of the polymerization initiator may be decomposed and may not be left in the functional layer, in some cases.

(2) Constitution of Functional Layer

Since the functional layer is excellent in light resistance and surface hardness, it may function as a hard coating layer.

The functional layer may be a single layer, and may be a multilayer.

The thickness of the functional layer is not particularly limited as long as it is a thickness capable of obtaining a functional layer satisfying the properties described above, and is preferably, for example, 0.5 μm or more and 50 μm or less, more preferably 1.0 μm or more and 40 μm or less, and further preferably 1.5 μm or more and 30 μm or less. When the thickness of the functional layer is too thin, the surface hardness or the strength of the functional layer may be deteriorated, and it may be difficult to unevenly distribute the inorganic based ultraviolet absorber in the functional layer. Also, when the thickness of the functional layer is too thick, the flexibility may be deteriorated.

Here, the thickness of the functional layer may be the average value of the thickness of arbitrary 10 points obtained by measuring from the thickness directional cross-section of the stacked body for a display device by observing with a transmission electron microscope (TEM), a scanning electron microscope (SEM) or a scanning transmission electron microscope (STEM). Incidentally, the same may be applied to the measuring methods of the thickness of other layers included in the stacked body for a display device.

The functional layer may be placed on one surface side of the substrate layer; among the above, since the functional layer is excellent in light resistance and surface hardness, the functional layer is preferably placed on the outermost surface in the stacked body for a display device. When the functional layer is placed on the outermost surface, the distance between the functional layer and the substrate layer may be increased so that the ultraviolet absorbing property may be improved.

Examples of a method for forming a functional layer may include a method wherein the substrate layer is coated with a resin composition for a functional layer, and cured.

3. Substrate Layer

The substrate layer in the present disclosure is a member configured to support the functional layer, and has transparency.

The substrate layer is not particularly limited as long as it has transparency; and examples thereof may include a resin substrate, and a glass substrate. Among the above, the resin substrate is preferable. Although a discolorment and a deterioration due to ultraviolet rays tend to occur in the resin substrate, in the stacked body for a display device in the present disclosure, a discolorment and a deterioration, due to ultraviolet rays, of the resin substrate may be suppressed by including the functional layer.

(1) Resin Substrate

The resin constituting the resin substrate is not particularly limited as long as it is able to obtain a resin substrate having transparency; and examples thereof may include a polyimide based resin, a polyamide based resin, and a polyester based resin. Examples of the polyimide based resin may include polyimide, polyamideimide, polyetherimide, and polyesterimide. Examples of the polyester based resin may include polyethylene terephthalate, polypropylene terephthalate, polybutylene terephthalate, and polyethylene naphthalate. Among them, the polyimide based resin, the polyamide based resin, or a mixture thereof is preferable, and the polyimide based resin is more preferable. The polyimide based resin and the polyamide based resin have bending resistance, and have high hardness. Also, although yellowing easily occurs in the polyimide based resin and the polyamide based resin, in the stacked body for a display device in the present disclosure, yellowing of the polyimide based resin and the polyamide based resin may be suppressed by including the functional layer.

The polyimide based resin is not particularly limited as long as it is able to obtain a resin substrate having transparency; and among the above, polyimide and polyamideimide are preferably used.

(a) Polyimide

The polyimide is obtained by reacting a tetracarboxylic acid component and a diamine component. The polyimide is not particularly limited as long as it satisfies the average value of the tensile storage elastic modulus described above and has transparency; and it is preferable to have at least one kind of the structure selected from the group consisting of the structure represented by the following general formula (1) and the following general formula (3), for example, from the viewpoint of having excellent transparency and excellent stiffness.

[Chemical 1]

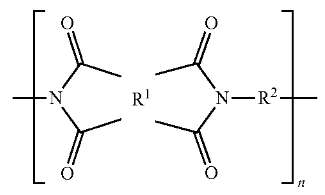

(1)

In the general formula (1), $R^1$ represents a tetravalent group which is a tetracarboxylic acid residue; and $R^2$ represents at least one kind of divalent group selected from the group consisting of a trans-cyclohexanediamine residue, a trans-1,4-bismethylenecyclohexanediamine residue, a 4,4'-diaminodiphenylsulfone residue, a 3,4'-diaminodiphenylsulfone residue, and a divalent group represented by the following general formula (2). The "n" represents the number of repeating units, and is 1 or more.

[Chemical 2]

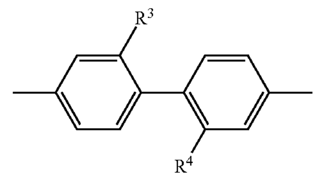

(2)

In the general formula (2), R 3 and R 4 each independently represents a hydrogen atom, an alkyl group, or a perfluoroalkyl group.

[Chemical 3]

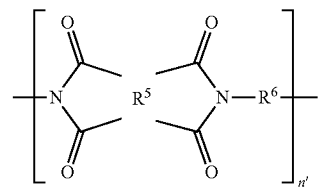

(3)

In the general formula (3), $R^5$ represents at least one kind of tetravalent group selected from the group consisting of a cyclohexane tetracarboxylic acid residue, a cyclopentanetetracarboxylic acid residue, a dicyclohexane-3,4,3',4'-tetracarboxylic acid residue, and a 4,4'-(hexafluoroisopropylidene)diphthalic acid residue; and $R^6$ represents a divalent group which is a diamine residue. The "n'" represents the number of repeating units, and is 1 or more.

Incidentally, "tetracarboxylic acid residue" refers to a residue obtained by excluding four carboxyl groups from a tetracarboxylic acid; and represents the same structure as a residue obtained by excluding an acid dianhydride structure from a tetracarboxylic acid dianhydride. Also, "diamine residue" refers to a residue obtained by excluding two amino groups from a diamine.

In the general formula (1), $R^1$ is a tetracarboxylic acid residue, and may be a residue obtained by excluding an acid dianhydride structure from a tetracarboxylic acid dianhydride. Examples of the tetracarboxylic acid dianhydride may include those described in WO 2018/070523. Among them, $R^1$ in the general formula (1) preferably includes at least one kind selected from the group consisting of a 4,4'-(hexafluoroisopropylidene)diphthalic acid residue, a 3,3',4,4'-biphenyltetracarboxylic acid residue, pyromellitic acid residue, a 2,3',3,4'-biphenyltetracarboxylic acid residue, a 3,3',4,4'-benzophenone tetracarboxylic acid residue, a 3,3',4,4'-diphenylsulfone tetracarboxylic acid residue, a 4,4'-oxydiphthalic acid residue, a cyclohexane tetracarboxylic acid residue, and a cyclopentane tetracarboxylic acid residue from the viewpoint of improved transparency and improved stiffness. It is further preferable to include at least one kind selected from the group consisting of a 4,4'-(hexafluoroisopropylidene)diphthalic acid residue, a 4,4'-oxydiphthalic acid residue and a 3,3',4,4'-diphenylsulfone tetracarboxylic acid residue.

In $R^1$, these preferable residues are preferably included in total of 50 mol % or more, more preferably 70 mol % or more, and further preferably 90 mol % or more.

Also, as $R^1$, it is also preferable to use a mixture of the followings: a tetracarboxylic acid residue group (Group A) suitable for improving rigidity such as at least one kind selected from the group consisting of a 3,3',4,4'-biphenyltetracarboxylic acid residue, a 3,3',4,4'-benzophenone tetracarboxylic acid residue, and a pyromellitic acid residue; and a tetracarboxylic acid residue group (Group B) suitable for improving transparency such as at least one kind selected from the group consisting of a 4,4'-(hexafluoroisopropylidene)diphthalic acid residue, a 2,3',3,4'-biphenyltetracarboxylic acid residue, a 3,3',4,4'-diphenylsulfone tetracarboxylic acid residue, a 4,4'-oxydiphthalic acid residue, a cyclohexane tetracarboxylic acid residue, and a cyclopentanetetracarboxylic acid residue.

In this case, in relation to the content ratio of the tetracarboxylic acid residue group suitable for improving the rigidity (Group A) and the tetracarboxylic acid residue group suitable for improving transparency (Group B), with respect to 1 mol of the tetracarboxylic acid residue group suitable for improving transparency (Group B), the tetracarboxylic acid residue group suitable for improving rigidity (Group A) is preferably 0.05 mol or more and 9 mol or less, more preferably 0.1 mol or more and 5 mol or less, and further preferably 0.3 mol or more and 4 mol or less.

Among them, $R^2$ in the general formula (1) is preferably at least one kind of divalent group selected from the group consisting of a 4,4'-diaminodiphenylsulfone residue, a 3,4'-diaminodiphenylsulfone residue, and a divalent group represented by the general formula (2); and is further preferably at least one kind of divalent group selected from the group consisting of a 4,4'-diaminodiphenylsulfone residue, a 3,4'-diaminodiphenylsulfone residue, and a divalent group represented by the general formula (2) wherein $R^3$ and $R^4$ are a perfluoroalkyl group, from the viewpoint of improved transparency and improved stiffness.

Among them, from the viewpoint of improved transparency and improved stiffness, $R^5$ in the general formula (3) preferably includes a 4,4'-(hexafluoroisopropylidene) diphthalic acid residue, a 3,3',4,4'-diphenylsulfontetracarboxylic acid residue, and oxydiphthalic acid residue.

The $R^5$ preferably includes 50 mol % or more, more preferably 70 mol % or more, and further preferably 90 mol % or more of these preferable residues.

The $R^6$ in the general formula (3) is a diamine residue, and may be a residue obtained by excluding two amino groups from a diamine. Examples of the diamine may include those described in, for example, WO 2018/070523. Among them, from the viewpoint of improved transparency and improved stiffness, $R^6$ in the general formula (3) preferably includes at least one kind of divalent group selected from the group consisting of a 2,2'-bis(trifluoromethyl)benzidine residue, a bis[4-(4-aminophenoxy)phenyl]sulfone residue, a 4,4'-diaminodiphenylsulfone residue, a 2,2-bis[4-(4-aminophenoxy)phenyl]hexafluoropropane residue, a bis[4-(3-aminophenoxy)phenyl]sulfone residue, a 4,4'-diamino-2,2'-bis(trifluoromethyl)diphenylether residue, a 1,4-bis[4-amino-2-(trifluoromethyl)phenoxy]benzene residue, a 2,2-bis[4-(4-amino-2-trifluoromethylphenoxy)phenyl]hexafluoropropane residue, a 4,4'-diamino-2-(trifluoromethyl)diphenyl ether residue, a 4,4'-diaminobenzanilide residue, a N,N'-bis(4-aminophenyl)terephthalamide residue and a 9,9-bis(4-aminophenyl)fluorene residue; and further preferably includes at least one kind of divalent group selected from the group consisting of a 2,2'-bis(trifluoromethyl)benzidine residue, a bis[4-(4-aminophenoxy)phenyl]sulfone residue, and a 4,4'-diaminodiphenylsulfone residue.

In $R^6$, these preferable residues are preferably included in total of 50 mol % or more, more preferably 70 mol % or more, and further preferably 90 mol % or more.

Also, as $R^6$, it is also preferable to use a mixture of the followings: a diamine residue group (Group C) suitable for improving rigidity such as at least one kind selected from the group consisting of a bis[4-(4-aminophenoxy)phenyl] sulfone residue, a 4,4'-diaminobenzanilide residue, a N,N'-bis(4-aminophenyl) terephthalamide residue, a paraphenylenediamine residue, a metaphenylenediamine residue, and a 4,4'-diaminodiphenylmethane residue; and a diamine residue group (Group D) suitable for improving transparency such as at least one kind selected from the group consisting of a 2,2'-bis(trifluoromethyl)benzidine residue, a 4,4'-diaminodiphenyl sulfone residue, a 2,2-bis[4-(4-aminophenoxy)phenyl] hexafluoropropane residue, a bis[4-(3-aminophenoxy)phenyl]sulfone residue, a 4,4'-diamino-2,2'-bis(trifluoromethyl)diphenylether residue, a 1,4-bis[4-amino-2-(tirfluoromethyle)phenoxy] benzene residue, a 2,2-bis[4-(4-amino-2-trifluoromethylphenoxy)phenyl] hexafluoropropane residue, a 4,4'-diamino-2(trifluoromethyl) dipenylether residue, and a 9,9-bis(4-aminophenyl)fluorene residue.

In this case, in relation to the content ratio of the diamine residue group suitable for improving rigidity (Group C) and the diamine residue group suitable for improving transparency (Group D), with respect to 1 mol of the diamine residue group suitable for improving transparency (Group D), the diamine residue group suitable for improving rigidity (Group C) is preferably 0.05 mol or more and 9 mol or less, more preferably 0.1 mol or more and 5 mol or less, and further preferably 0.3 mol or more and 4 mol or less.

In the structure represented by the general formula (1) and the general formula (3), "n" and "nr" each independently represents the number of repeating units, and is 1 or more. The number of repeating units "n" in the polyimide may be appropriately selected according to the structure, and is not particularly limited. The average number of repeating units may be, for example, 10 or more and 2000 or less, and is preferably 15 or more and 1000 or less.

Also, the polyimide may include a polyamide structure in a part thereof. Examples of the polyamide structure that may be included may include a polyamideimide structure including a tricarboxylic acid residue such as trimellitic acid anhydride; and a polyamide structure including a dicarboxylic acid residue such as terephthalic acid.

From the viewpoint of improved transparency and improved surface hardness, at least one of the tetravalent group which is a tetracarboxylic acid residue of $R^1$ or $R^5$, and the divalent group which is a diamine residue of $R^2$ or $R^6$ preferably includes an aromatic ring; and preferably includes at least one selected from the group consisting of (i) a fluorine atom, (ii) an aliphatic ring, and (iii) a structure wherein aromatic rings are connected to each other by an alkylene group which may be substituted with a sulfonyl group or a fluorine. When the polyimide includes at least one kind selected from a tetracarboxylic acid residue including an aromatic ring, and a diamine residue including an aromatic ring, the molecular skeleton becomes rigid, the orientation property is increased, and the surface hardness is improved; however, the absorption wavelength of the rigid aromatic ring skeleton tends to be shifted to the longer wavelength side, and the transmittance of the visible light region tends to be decreased. Meanwhile, when the polyimide includes (i) a fluorine atom, the transparency is improved since it may make the electronic state in the polyimide skeleton to a state wherein a charge transfer is difficult.

Also, when the polyimide includes (ii) an aliphatic ring, transparency is improved since the transfer of charge in the skeleton may be inhibited by breaking the conjugation of n electrons in the polyimide skeleton. Also, when the polyimide includes (iii) a structure wherein aromatic rings are connected to each other by an alkylene group which may be substituted with a sulfonyl group or a fluorine, transparency is improved since the transfer of charge in the skeleton may be inhibited by breaking the conjugation of n electrons in the polyimide skeleton.

Among them, from the viewpoint of improved transparency and improved surface hardness, at least one of the tetravalent group which is a tetracarboxylic acid residue of $R^1$ or $R^5$, and the divalent group which is a diamine residue of $R^2$ or $R^6$ preferably includes an aromatic ring and a fluorine atom; and the divalent group which is a diamine residue of $R^2$ or $R^6$ preferably includes an aromatic ring and a fluorine atom.

Specific examples of such polyimide may include those having a specific structure described in WO 2018/070523.

The polyimide may be synthesized by a known method. Also, a commercially available polyimide may be used. Examples of the commercially available products of polyimide may include Neopulim (registered trademark) from Mitsubishi Gas Chemical Company, Inc.

The weight average molecular weight of the polyimide is preferably, for example, 3000 or more and 500,000 or less, more preferably 5000 or more and 300,000 or less, and further preferably 10,000 or more and 200,000 or less. When the weight average molecular weight is too low, sufficient strength may not be obtained, and when the weight average molecular weight is too high, the viscosity is increased and the solubility is decreased, so that a substrate layer having a smooth surface and uniform thickness may not be obtained in some cases.

Incidentally, the weight average molecular weight of the polyimide may be measured by gel permeation chromatography (GPC). Specifically, the polyimide is used as a N-methylpyrrolidone (NMP) solution having a concentration of 0.1% by mass; a 30 mmol % LiBr-NMP solution with a water content of 500 ppm or less is used as a developing solvent; and measurement is carried out using a GPC device (HLC-8120, used column: GPC LF-804 from SHODEX) from Tosoh Corporation, under conditions of a sample injecting amount of 50 μL, a solvent flow rate of 0.4 mL/min, and at 37 °C. The weight average molecular weight is determined on the basis of a polystyrene standard sample having the same concentration as that of the sample.

(b) Polyamideimide

The polyamideimide is not particularly limited as long as it is able to obtain a resin substrate having transparency; and examples thereof may include those having a first block including a constituent unit derived from dianhydride, and a constituent unit derived from diamine; and a second block including a constituent unit derived from aromatic dicarbonyl compound, and a constituent unit derived from aromatic diamine. In the polyamideimide described above, the dianhydride may include, for example, biphenyltetracarboxylic acid dianhydride (BPDA) and 2-bis(3,4-dicarboxyphenyl) hexafluoropropanedianhydride (6FDA). Also, the diamine may include bistrifluoromethylbenzidine (TFDB). That is, the polyamideimide has a structure wherein a polyamideimide precursor including a first block wherein monomers including dianhydride and diamine are copolymerized; and a second block wherein monomers including an aromatic dicarbonyl compound and an aromatic diamine are copolymerized, is imidized.

By including the first block including an imide bond and the second block including an amide bond, the polyamideimide is excellent in not only optical properties but also thermal and mechanical properties.

In particular, by using bistrifluoromethylbenzidine (TFDB) as the diamine forming the first block, thermal stability and optical properties may be improved. Also, by using 2-bis(3,4-dicarboxyphenyl)hexafluoropropane dianhydride (6FDA) and biphenyltetracarboxylic acid dianhydride (BPDA) as the dianhydride forming the first block, birefringence may be improved, and heat resistance may be secured.

The dianhydride forming the first block comprises two kinds of dianhydrides, that is, 6FDA and BPDA. In the first block, a polymer to which TFDB and 6FDA are bonded, and a polymer to which TFDB and BPDA are bonded may be included, based on separate repeating units, respectively segmented; may be regularly arranged within the same repeating unit; and may be included in a completely random arrangement.

Among the monomers forming the first block, BPDA and 6FDA are preferably included as dianhydrides in a molar ratio of 1:3 to 3:1. This is because it is possible not only to secure the optical properties, but also to suppress deterioration of mechanical properties and heat resistance, and it is possible to have excellent birefringence.

The molar ratio of the first block and the second block is preferably 5:1 to 1:1.

When the content of the second block is remarkably low, the effect of improving the thermal stability and mechanical properties due to the second block may not be sufficiently obtained in some cases. Also, when the content of the second block is higher than the content of the first block, although the thermal stability and mechanical properties may be improved, optical properties such as yellowness and transmittance, may be deteriorated, and the birefringence property may also be increased in some cases. Incidentally, the first block and the second block may be random copolymers, and may be block copolymers. The repeating unit of the block is not particularly limited.

Examples of the aromatic dicarbonyl compound forming the second block may include one kind or more selected from the group consisting of terephthaloyl chloride (p-terephthaloyl chloride, TPC), terephthalic acid, iso-phthaloyl dichloride, and 4,4'-benzoyl dichloride (4,4'-benzoyl chloride). One kind or more selected from terephthaloyl chloride (p-terephthaloyl chloride, TPC) and iso-phthaloyl dichloride may be preferably used.

Examples of the diamine forming the second block may include diamines including one kind or more flexible group selected from the group consisting of 2,2-bis(4-(4-aminophenoxy)phenyl)hexafluoropropane (HFBAPP), bis(4-(4-aminophenoxy)phenyl)sulfone (BAPS), bis(4-(3-aminophenoxy)phenyl)sulfone (BAPSM), 4,4'-diaminodiphenyl sulfone (ODDS), 3,3'-diaminodiphenyl sulfone (3DDS), 2,2-bis(4-(4-aminophenoxy)phenylpropane (BAPP), 4,4'-diaminodiphenylpropane (6HDA), 1,3-bis(4-aminophenoxy) benzene (134APB), 1,3-bis(3-aminophenoxy)benzene (133APB), 1,4-bis(4-aminophenoxy)biphenyl (BAPB), 4,4'-bis(4-amino-2-trifluoromethylphenoxy)biphenyl (6FAPBP), 3,3-diamino-4,4-dihydroxydiphenylsulfone (DABS), 2,2-bis(3-amino-4-hydroxyloxyphenyl)propane (BAP), 4,4'-diaminodiphenylmethane (DDM), 4,4'-oxydianiline (4-ODA) and 3,3'-oxydianiline (3-ODA).

When the aromatic dicarbonyl compound is used, it is easy to realize high thermal stability and mechanical properties, but may exhibit high birefringence due to the benzene ring in the molecular structure. Therefore, in order to suppress the decrease in birefringence due to the second block, it is preferable to use a diamine wherein a flexible group is introduced into the molecular structure. Specifically, the diamine is more preferably one kind or more diamine selected from bis(4-(3-aminophenoxy)phenyl)sulfone (BAPSM), 4,4'-diaminodiphenylsulfone (ODDS) and 2,2-bis(4-(4-aminophenoxy)phenyl)hexafluoropropane (HFBAPP). In particular, the longer the length of the flexible group such as BAPSM, and a diamine including a substituent group at meta position, the better the birefringence may be exhibited.

For the polyamideimide precursor including a first block wherein a dianhydride including a biphenyltetracarboxylic acid dianhydride (BPDA) and a 2-bis(3,4-dicarboxyphenyl) hexafluoropropanedianhydride (6FDA), and a diamine including bistrifluoromethylbenzidine (TFDB) are copolymerized; and a second block wherein an aromatic dicarbonyl compound and an aromatic diamine are copolymerized, in the molecular structure, the weight average molecular weight measured by GPC is preferably, for example, 200,000 or more and 215,000 or less, and the viscosity is preferably, for example, 2400 poise or more and 2600 poise or less.

The polyamideimide may be obtained by imidizing a polyamideimide precursor. Also, a polyamideimide film may be obtained using the polyamideimide.

For a method for imidizing the polyamideimide precursor and a method for producing a polyamideimide film, JP-A No. 2018-506611, for example, may be referred.

(c) Thickness of Resin Substrate

The thickness of the resin substrate is not particularly limited as long as it has a thickness capable of having flexibility, and is preferably, for example, 10 μm or more and 100 μm or less, and more preferably 25 μm or more and 80 μm or less. When the thickness of the resin substrate is in the above range, excellent flexibility may be obtained, and at the same time, sufficient hardness may be obtained. It is also possible to suppress curling of the stacked body for a display device. Furthermore, it is preferable in terms of reducing the weight of the stacked body for a display device.

(2) Glass Substrate

The glass constituting the glass substrate is not particularly limited as long as it has transparency; and examples thereof may include silicate glass and silica glass. Among them, borosilicate glass, aluminosilicate glass, and aluminoborosilicate glass are preferable, and alkali-free glass is more preferable. Examples of the commercial products of the glass substrate may include ultra-thin plate glass G-Leaf from Nippon Electric Glass Co., Ltd., and ultra-thin film glass from Matsunami Glass Ind., Ltd.

Also, the glass constituting the glass substrate is preferably a chemically strengthened glass. The chemically strengthened glass is preferable since it has excellent mechanical strength and may be made thin accordingly. The chemically strengthened glass is typically a glass wherein mechanical properties are strengthened by a chemical method by partially exchanging ionic species, such as by replacing sodium with potassium, in the vicinity of the surface of glass, and includes a compressive stress layer on the surface.

Examples of the glass constituting the chemically strengthened glass substrate may include aluminosilicate glass, soda-lime glass, borosilicate glass, lead glass, alkali barium glass, and aluminoborosilicate glass.

Examples of the commercial products of the chemically strengthened glass substrate may include Gorilla Glass from Corning Incorporated, Dragontrail from AGC Inc., and chemically strengthened glass from Schott Ag.

The thickness of the glass substrate is not particularly limited as long as it has a thickness capable of having flexibility, and is preferably, for example, 200 μm or less, more preferably 15 μm or more and 100 μm or less, further preferably 20 μm or more and 90 μm or less, and particularly preferably 25 μm or more and 80 μm or less. When the thickness of the glass substrate is in the above range, excellent flexibility may be obtained, and at the same time, sufficient hardness may be obtained. It is also possible to suppress curling of the stacked body for a display device. Furthermore, it is preferable in terms of reducing the weight of the stacked body for a display device.

4. Second Functional Layer

The stacked body for a display device in the present disclosure may include a second functional layer on the substrate layer, on the functional layer surface side or on an opposite surface side to the functional layer. Examples of the second functional layer may include a hard coating layer, antireflection layer, an antiglare layer, a scattering prevention layer, an antifouling layer, and a primer layer.

Also, the second functional layer may be a single layer, and may include a plurality of layers. Also, the second functional layer may be a layer having a single function, and may include a plurality of layers having functions different from each other.

The arrangement of the second functional layer is not particularly limited as long as the second functional layer is placed on the substrate layer, on the functional layer surface side or on an opposite surface side to the functional layer, and for example, the second functional layer may be placed between the substrate layer and the functional layer, may be placed on the functional layer, on an opposite surface side to the substrate layer, and may be placed on the substrate layer, on an opposite surface side to the functional layer.

A hard coating layer is hereinafter exemplified as the second functional layer.

(1) Hard Coating Layer

The stacked body for a display device in the present disclosure may include a hard coating layer on the functional layer surface side of the substrate layer. The hard coating layer is a member to enhance the surface hardness. By placing the hard coating layer, scratch resistance may be improved. Particularly, when the substrate layer is a resin substrate, the scratch resistance may be effectively improved by placing the hard coating layer.

The arrangement of the hard coating layer is not particularly limited as long as the hard coating layer is placed on the functional layer surface side of the substrate layer. For example, the hard coating layer may be placed between the substrate layer and the functional layer, and may be placed on the functional layer, on an opposite surface side to the substrate layer.

As a material of the hard coating layer, for example, an organic material, an inorganic material, and an organic-inorganic composite material may be used.

Among the above, the material of the hard coating layer is preferably an organic material. Specifically, the hard coating layer preferably include a cured product of a resin composition including a polymerizable compound. The cured product of a resin composition including a polymerizable compound may be obtained by carrying out a polymerization reaction of a polymerizable compound, by a known method using a polymerization initiator if necessary.

Incidentally, since the polymerizable compound may be similar to those described in the section of the functional layer above, the explanation is omitted herein.

The hard coating layer may include a polymerization initiator if necessary. Incidentally, since the polymerization initiator may be similar to those described in the section of the functional layer above, the explanation is omitted herein.

The hard coating layer may further include an additive if necessary. The additive is appropriately selected according to the function imparted to the hard coating layer, and is not particularly limited. Examples thereof may include a filler such as an inorganic particle, an organic particle; an ultraviolet absorber; an infrared absorber; an antifoulant; an antiglare agent; a leveling agent; a surfactant; an easy lubricant; various sensitizers; a flame retardant; an adhesive imparting agent; a polymerization initiator; a polymerization inhibitor; an antioxidant; a light stabilizer; an antistatic agent; and a surface modifier.

The thickness of the hard coating layer may be appropriately selected according to the function of the hard coating layer and the use application of the stacked body for a display device. The thickness of the hard coating layer is preferably, for example, 0.5 μm or more and 50 μm or less, more preferably 1.0 μm or more and 40 μm or less, further preferably 1.5 μm or more and 30 μm or less, and particularly preferably 2 μm or more and 20 μm or less. When the thickness of hard coating layer is in the above range, sufficient hardness as the hard coating layer may be obtained.

Examples of a method for forming a hard coating layer may include a method wherein the substrate layer is coated with a resin composition for a hard coating layer including the polymerizable compound, and cured.

5. Impact Absorbing Layer

The stacked body for a display device in the present disclosure may include an impact absorbing layer on the substrate layer, on an opposite surface side to the functional layer, or between the substrate layer and the functional layer. By placing the impact absorbing layer, when an impact is imparted to the stacked body for a display device, the impact is absorbed so that the impact resistance may be improved. Also, when the substrate layer is a glass substrate, the crack of the glass substrate may be suppressed.

The material of the impact absorbing layer is not particularly limited as long as it is capable of obtaining an impact absorbing layer having an impact absorbing property, and transparency, and examples thereof may include polyethylene terephthalate (PET), polyethylene naphthalate (PEN), urethane resin, epoxy resin, polyimide, polyamideimide, acrylic resin, triacetyl cellulose (TAC), and silicone resin. One kind of these materials may be used alone, and two kinds or more may be used in combination.

The impact absorbing layer may further include an additive if necessary. Examples of the additive may include a filler such as an inorganic particle and an organic particle; an ultraviolet absorber; an antioxidant; a light stabilizer; a surfactant; and an adhesive improving agent.

The thickness of the impact absorbing layer may be the thickness capable of absorbing an impact, and is preferably, for example, 5 μm or more and 150 μm or less, more preferably 10 μm or more and 120 μm or less, and further preferably 15 μm or more and 100 μm or less.

As the impact absorbing layer, for example, a resin film may be used. Also, for example, the impact absorbing layer may be formed by coating the substrate layer with a composition for an impact absorbing layer.

6. Adhesive Layer for Adhesion

Figure 4:
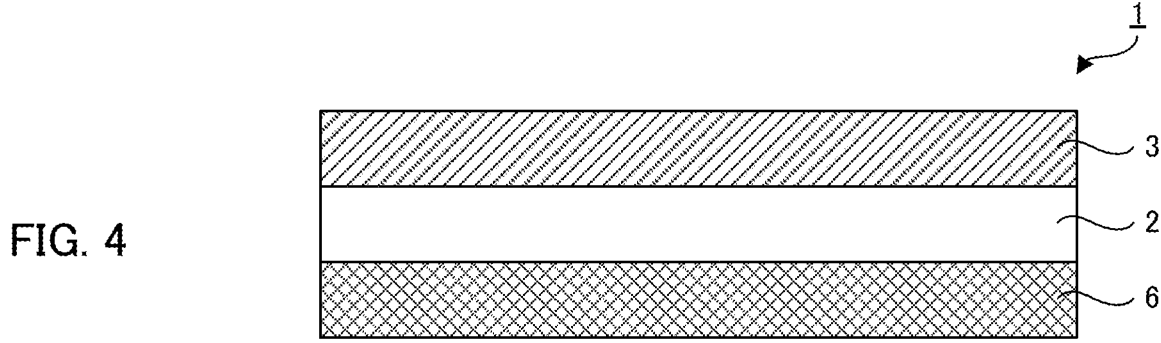
FIG. 4 is a schematic cross-sectional view illustrating an example of a stacked body for a display device in the present disclosure.

For example, as shown in FIG. 4, the stacked body for a display device in the present disclosure may include adhesive layer for adhesion 6 on the substrate layer 2, on an opposite surface side to the functional layer 3. The stacked body for a display device may be adhered to, for example, a display panel via the adhesive layer for adhesion.

The adhesive used for the adhesive layer for adhesion is not particularly limited as long as it is an adhesive having transparency, and is capable of adhering the stacked body for a display device to, for example, a display panel. Examples thereof may include a thermosetting adhesive, an ultraviolet curable adhesive, a two-component curable adhesive, a thermal fusion adhesive, and a pressure-sensitive adhesive (so-called tackiness agent).

Figure 5:
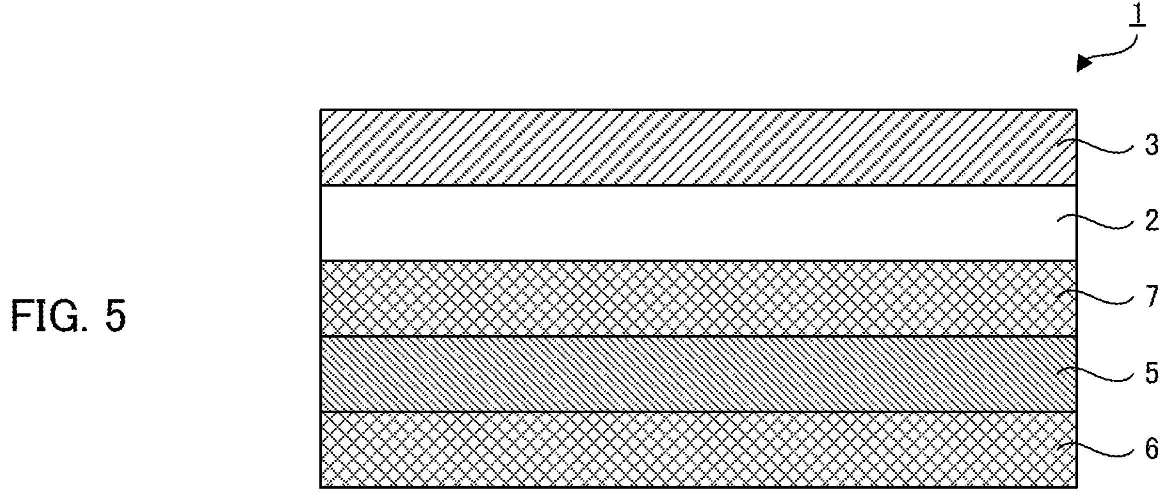
FIG. 5 is a schematic cross-sectional view illustrating an example of a stacked body for a display device in the present disclosure.

Among the above, when an impact absorbing layer 5 is placed on the substrate layer 2, on an opposite surface side to the functional layer 3, the adhesive layer for adhesion 6 is placed on the impact absorbing layer 5, on an opposite surface side to the substrate layer 2, and the interlayer adhesive layer 7 described later is placed between the substrate layer 2 and the impact absorbing layer 5 as shown in FIG. 5, for example, the adhesive layer for adhesion and the interlayer adhesive layer preferably include the pressure-sensitive adhesive, that is, preferably pressure-sensitive adhesive layers. Generally, the pressure-sensitive adhesive layer is relatively a soft layer among the adhesive layers including the adhesives described above. The impact resistance may be improved by including the impact absorbing layer between the pressure-sensitive adhesive layers those are relatively soft. Since the pressure-sensitive adhesive layer is relatively soft so as to be easily deformed, the impact absorbing layer is easily deformed when an impact is applied to the stacked body for a display device because the deformation of the impact absorbing layer is not suppressed by the pressure-sensitive adhesive layer so that higher impact absorbing effect is believed to be exhibited.

Examples of the pressure-sensitive adhesive used for the pressure-sensitive adhesive layer may include an acrylic based pressure-sensitive adhesive, a silicone based pressure-sensitive adhesive, a rubber based pressure-sensitive adhesive, and a urethane based pressure-sensitive adhesive, and may be appropriately selected according to the material of the impact absorbing layer. Among the above, an acrylic based pressure-sensitive adhesive is preferable because of excellent transparency, weather resistance, durability, and heat resistance, and low cost.

The thickness of the adhesive layer for adhesion is preferably, for example, 10 μm or more and 100 μm or less, more preferably 25 μm or more and 80 μm or less, and further preferably 40 μm or more and 60 μm or less. When the thickness of the adhesive layer for adhesion is too thin, the stacked body for a display device and the display panel may not be adhered sufficiently. Also, when the adhesive layer for adhesion is a pressure-sensitive adhesive layer, if the thickness of the adhesive layer for adhesion is too thin, the effect of making the impact absorbing layer to be easily deformed, when an impact is imparted to the stacked body for a display device, may not be obtained sufficiently. Meanwhile, when the thickness of the adhesive layer for adhesion is too thick, the flexibility may be deteriorated.

As the adhesive layer for adhesion, for example, an adhesive film may be used. Also, for example, the adhesive layer for adhesion may be formed by coating a supporting body or the substrate layer, for example, with an adhesive composition.

7. Interlayer Adhesive Layer

In the stacked body for a display device in the present disclosure, an interlayer adhesive layer may be placed between each layer.

The adhesive used for the interlayer adhesive layer may be similar to the adhesive used for the adhesive layer for adhesion described above.

Among the above, as described above, when the impact absorbing layer is placed on the substrate layer, on the opposite surface side to the functional layer; the adhesive layer for adhesion is placed on the impact absorbing layer, on the opposite surface side to the substrate layer; and the interlayer adhesive layer is placed between the substrate layer and the impact absorbing layer, the adhesive layer for adhesion and the interlayer adhesive layer preferably include the pressure-sensitive adhesive, that is, they are preferably pressure-sensitive adhesive layers.

The pressure-sensitive adhesive layer may be similar to the pressure-sensitive adhesive layer used for the adhesive layer for adhesion.

The thickness of the interlayer adhesive layer, and the forming method, for example, may be similar to the thickness, and the forming method, for example, of the adhesive layer for adhesion.

8. Others Regarding Stacked Body for Display Device

The thickness of the stacked body for a display device in the present disclosure is preferably, for example, 10 μm or more and 500 μm or less, more preferably 20 μm or more and 400 μm or less, and further preferably 30 μm or more and 300 μm or less. When the thickness of the stacked body for a display device is in the above range, the flexibility may be improved.

The stacked body for a display device in the present disclosure may be used as a front panel placed on the observer side than the display panel in a display device. Among the above, the stacked body for a display device in the present disclosure may be preferably used as a front panel in a flexible display device such as a foldable display, a rollable display, and a bendable display. Particularly, since the deterioration of the visibility at bent portion may be suppressed by suppressing the yellowing, the stacked body for a display device in the present disclosure may be preferably used as a front panel in a foldable display.

Also, the stacked body for a display device in the present disclosure may be used as a front panel in a display device such as smart phones, tablet terminals, wearable terminals, personal computers, televisions, digital signages, public information displays (PIDs), and car mounted displays.

B. Display Device

The display device in the present disclosure comprises: a display panel, and the stacked body for a display device described above placed on an observer side of the display panel.

Figure 6:
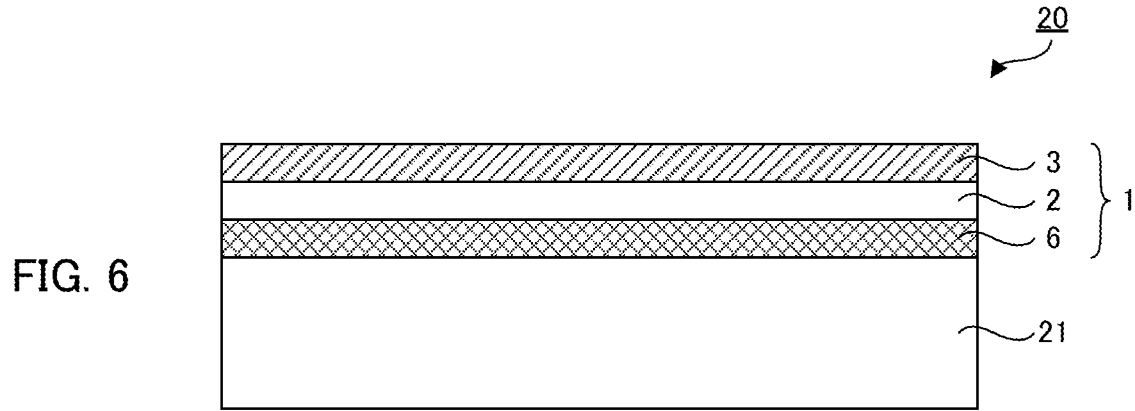
FIG. 6 is a schematic cross-sectional view illustrating an example of a display device in the present disclosure.

FIG. 6 is a schematic cross-sectional view illustrating an example of a display device in the present disclosure. As shown in FIG. 6, display device 20 comprises display panel 21, and the stacked body for a display device 1 placed on an observer side of the display panel 21. In the display device 20, the stacked body for a display device 1 and the display panel 21 may be adhered via, for example, the adhesive layer for adhesion 6 of the stacked body for a display device 1.

When the stacked body for a display device in the present disclosure is placed on the surface of the display device, it is placed so that the functional layer is on the outer side, and the substrate layer is on the inner side.

The method for placing the stacked body for a display device in the present disclosure on the surface of the display device is not particularly limited, and examples thereof may include a method via an adhesive layer.

Examples of the display panel in the present disclosure may include a display panel used for a display device such as an organic EL display device, and a liquid crystal display device.

The display device in the present disclosure may include a touch-sensitive panel member between the display panel and the stacked body for a display device.

Among the above, the display device in the present disclosure is preferably a flexible display device such as a foldable display, a rollable display, and a bendable display.

Also, the display device in the present disclosure is preferably foldable. That is, the display device in the present disclosure is preferably a foldable display. Since the deterioration of the visibility at bent portion may be suppressed by suppressing the yellowing, the display device in the present disclosure may be preferably used as a foldable display.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

The present disclosure is hereinafter explained in further details with reference to Examples and Comparative Examples.

Example 1

Firstly, a resin composition for a functional layer was obtained by compounding each component so as to be the composition shown below.

(Composition of Resin Composition for Functional Layer)

Polymerization initiator (1-hydroxycyclohexylphenylketone, product name "Omnirad184" from IGM Resins B.V.): 3 parts by mass Leveling agent (product name "BYKUV3500" from BYK-Chemie Japan Co., Ltd.): 0.5 parts by mass (solid content 100% conversion value)

- Dipentaerythritol EO modified hexaacrylate (product name "A-DPH-12E" from Shin-Nakamura Chemical Co., Ltd.): 85 parts by mass
- Phenoxyethyl Acrylate (product name "Viscoat #192" from Osaka Organic Chemical Industry Ltd.): 15 parts by mass
- Organic based ultraviolet absorber (product name "Tinuvin479" from BASF Japan): 2 parts by mass
- Inorganic based ultraviolet absorber (titanium oxide, average primary particle size: 50 nm, from Tayca Corporation): 1 part by mass (solid content 100% conversion value)
- Methyl isobutyl ketone: 200 parts by mass Then, using a polyimide film (product name "Neopulim" from Mitsubishi Gas Chemical Company, Inc.) having a thickness of 50 μm as a substrate layer, a coating film was formed on the substrate layer by applying the resin composition for a functional layer with a bar coater. Thereafter, the coating film was heated at 70 °C for 1 minute to evaporate the solvent in the coating film, and the coating film was cured by irradiating ultraviolet rays with an ultraviolet ray irradiation device (light source H bulb from Fusion UV Systems Japan K.K) under the condition of an oxygen concentration of 200 ppm or less so that the integrated light amount was 500 mJ/$cm^2$ to form a functional layer with a thickness of 5 μm. Thus, a stacked body was obtained.

Examples 2 to 11, 16

A stacked body was produced in the same manner as in Example 1 except that, in the resin composition for a functional layer, the content of the organic based ultraviolet absorber, inorganic based ultraviolet absorber, color conditioner and silica particle were changed as shown in Table 1 below. Incidentally, the following color conditioner and silica particle were used.

- Color conditioner (cobalt particles from CIK Nano Tek Corporation)
- Silica particle (average primary particle size: 12 nm, from Nissan Chemical Corporation)

Example 12

A stacked body was produced in the same manner as in Example 1 except that, in the resin composition for a functional layer, the inorganic based ultraviolet absorber was changed to the following inorganic based ultraviolet absorber.

- Inorganic based ultraviolet absorber (titanium oxide, average primary particle size: 80 nm, from Tayca Corporation)

Example 13

A stacked body was produced in the same manner as in Example 1 except that, in the formation of the functional layer, after forming a coating film, the coating film was dried by heating at 50 °C for 120 seconds. In this stacked body, the inorganic based ultraviolet absorber was unevenly distributed on the surface of the functional layer.

Example 14

A stacked body was produced in the same manner as in Example 3 except that, in the resin composition for a functional layer, the silica particle was changed to the following silica particle.

- Silica particle (average primary particle size: 200 nm, from Sanyo Color Works, Ltd.)

Comparative Examples 1 to 11

A stacked body was produced in the same manner as in Example 1 except that, in the resin composition for a functional layer, the content of the organic based ultraviolet absorber, inorganic based ultraviolet absorber, color conditioner and silica particle were changed as shown in Table 2 below. Incidentally, the following color conditioner and silica particle were used.

- Color conditioner (cobalt particles from CIK Nano Tek Corporation)
- Silica particle (average primary particle size: 12 nm, from Nissan Chemical Corporation)

Comparative Example 12

A stacked body was produced in the same manner as in Example 1 except that, in the resin composition for a functional layer, the inorganic based ultraviolet absorber was changed to the following inorganic based ultraviolet absorber.

- Inorganic based ultraviolet absorber (titanium oxide, average primary particle size: 5 nm, from Resino Color Industry Co., Ltd.)

Example 15

A stacked body was produced in the same manner as in Example 1 except that, in the resin composition for a functional layer, the inorganic based ultraviolet absorber was changed to the following inorganic based ultraviolet absorber.

- Inorganic based ultraviolet absorber (titanium oxide, average primary particle size: 100 nm, from Sanyo Color Works, Ltd.)

Example 17

Firstly, a resin composition for a functional layer 2 was obtained by compounding each component so as to be the composition shown below.

(Composition of Resin Composition for Functional Layer 2)

- Polymerization initiator (1-hydroxycyclohexylphenylketone, product name "Omnirad184" from IGM Resins B. V.): 3 parts by mass
- Dipentaerythritol EO modified hexaacrylate (product name "A-DPH-12E" from Shin-Nakamura Chemical Co., Ltd.): 85 parts by mass
- Phenoxyethyl Acrylate (product name "Viscoat #192" from Osaka Organic Chemical Industry Ltd.): 15 parts by mass
- Organic based ultraviolet absorber (product name "Tinuvin479" from BASF Japan): 2 parts by mass
- Inorganic based ultraviolet absorber (titanium oxide, average primary particle size: 50 nm, from Tayca Corporation): 1 part by mass (solid content 100% conversion value)
- Methyl isobutyl ketone: 200 parts by mass Then, using a polyimide film (product name "Neopulim" from Mitsubishi Gas Chemical Company, Inc.) having a thickness of 50 μm as a substrate layer, a coating film was formed on the substrate layer by applying the resin composition for a functional layer 2 with a bar coater. Thereafter, the coating film was heated at 70 °C for 1 minute to evaporate the solvent in the coating film, and the coating film was cured by irradiating ultraviolet rays with an ultraviolet ray irradiation device (light source H bulb from Fusion UV Systems Japan K.K) under the condition of an oxygen concentration of 200 ppm or less so that the integrated light amount was 50 mJ/$cm^2$ to form a functional layer with a thickness of 5 μm. Thus, a member for a stacked body was obtained.

Then, a resin composition for a second functional layer 1 was obtained by compounding each component so as to be the composition shown below.

(Composition of Resin Composition for Second Functional Layer 1)

- Polymerization initiator (1-hydroxycyclohexylphenylketone, product name "Omnirad184" from IGM Resins B.V.): 3 parts by mass
- Leveling agent (product name "BYKUV3500" from BYK-Chemie Japan Co., Ltd.): 0.5 parts by mass (solid content 100% conversion value)
- Triethylene glycol diacrylate (product name "3EG-A", from Kyoeisha Chemical Co., Ltd.): 35 parts by mass
- Pentaerythritol tri and tetra acrylate (product name "M-450", from Toagosei Co., Ltd.): 65 parts by mass
- Methyl isobutyl ketone: 230 parts by mass Then, a coating film was formed on the functional layer of the member for a stacked body, on an opposite surface side to the substrate layer side by applying the resin composition for a second functional layer 1 with a bar coater. Thereafter, the coating film was heated at 70 °C for 1 minute to evaporate the solvent in the coating film, and the coating film was cured by irradiating ultraviolet rays with an ultraviolet ray irradiation device (light source H bulb from Fusion UV Systems Japan K.K) under the condition of an oxygen concentration of 200 ppm or less so that the integrated light amount was 500 mJ/$cm^2$ to form a second functional layer with a thickness of 4 μm. Thus, a stacked body was obtained.

Examples 18 to 20

A stacked body was produced in the same manner as in Example 17 except that the content of the color conditioner and silica particle were changed as shown in Table 1 below. The following color conditioner and silica particle were used.

- Color conditioner (cobalt particles from CIK Nano Tek Corporation)
- Silica particle (average primary particle size: 12 nm, from Nissan Chemical Corporation)

Example 21

Firstly, a resin composition for a second functional layer 2 was obtained by compounding each component so as to be the composition shown below.

(Composition of Resin Composition for Second Functional Layer 2)

- Polymerization initiator (1-hydroxycyclohexylphenylketone, product name "Omnirad184" from IGM Resins B.V.): 3 parts by mass
- Triethylene glycol diacrylate (product name "3EG-A", from Kyoeisha Chemical Co., Ltd.): 35 parts by mass
- Pentaerythritol tri and tetra acrylate (product name "M-450", from Toagosei Co., Ltd.): 65 parts by mass
- Methyl isobutyl ketone: 230 parts by mass Then, a functional layer was formed in the same manner as in Example 1, and a coating film was formed on the substrate layer, on an opposite surface side to the functional layer side by applying the resin composition for a second functional layer 2 with a bar coater. Thereafter, the coating film was heated at 70 °C for 1 minute to evaporate the solvent in the coating film, and the coating film was cured by irradiating ultraviolet rays with an ultraviolet ray irradiation device (light source H bulb from Fusion UV Systems Japan K.K) under the condition of an oxygen concentration of 200 ppm or less so that the integrated light amount was 500 mJ/$cm^2$ to form a second functional layer with a thickness of 4 μm. Thus, a stacked body was obtained.

Example 22

Firstly, a first functional layer and a first second functional layer were formed in the same manner as in Example 17, and a coating film was formed on the substrate layer, on an opposite surface side to the first functional layer by applying the resin composition for a second functional layer 2 with a bar coater. Thereafter, the coating film was heated at 70 °C for 1 minute to evaporate the solvent in the coating film, and the coating film was cured by irradiating ultraviolet rays with an ultraviolet ray irradiation device (light source H bulb from Fusion UV Systems Japan K.K) under the condition of an oxygen concentration of 200 ppm or less so that the integrated light amount was 500 mJ/$cm^2$ to form a second second functional layer with a thickness of 4 μm. Thus, a stacked body was obtained.

[Evaluation]

(1) Value ($\Delta(YI_1)$) Obtained by Subtracting Second Transmitted Yellowness ($YI_2$) from First Transmitted Yellowness ($YI_1$)

(1-1) Measurement of Transmitted Yellowness Measured by Colorimetry Method not Using Integrating Sphere (First Transmitted Yellowness) ($YI_1$)

The measurement of the transmitted yellowness by the colorimetry method not using the integrating sphere (first transmitted yellowness) ($YI_1$) was carried out by the following procedure. Using a spectrophotometer (product name "UV-2600" from Shimadzu Corporation), the optical system of this spectrophotometer was an optical system not via an integrating sphere which divides the light from the light source into the light flux on the control side and the light flux on the sample side, and makes them enter into the detector separately. Firstly, the stacked body cut into a size of 50 mm×50 mm was placed on the film holder for the luminous flux on the sample side of the spectrophotometer so that the functional layer side surface was on the light source side. The stacked body was free from flaws (contamination), cracks, wrinkles and smudges, and was held on the spectrophotometer in a flat, curl-free state.

Under this situation, the transmittance was measured under the measurement conditions of at least two points for each 1 nm space back and forth between wavelength of 300 nm or more and 780 nm or less, and the transmitted yellowness measured by a colorimetry method not using an integrating sphere (first transmitted yellowness) ($YI_1$) was determined from the tristimulus values in the XYZ color system, according to JIS K7373:2006.

(Measurement Conditions)

- Wavelength range: 300 nm or more and 780 nm or less
- Scan speed: fast
- Slit width: 5.0 nm
- Sampling interval: 0.5 nm interval
- Illumination: C
- Light source: D2 and WI
- Switching wavelength of light source: 360 nm
- S/R switch: standard Auto Zero: carried out at 550 nm after baseline scan (1-2) Measurement of Transmitted Yellowness Measured by Colorimetry Method Using Integrating Sphere (Second Transmitted Yellowness) ($YI_2$)

The measurement of the transmitted yellowness by the colorimetry method using the integrating sphere (second transmitted yellowness) ($YI_2$) was carried out by the following procedure. Using a spectrophotometer (product name "UV-2600" from Shimadzu Corporation), the optical system of this spectrophotometer was an optical system via an integrating sphere wherein the light from the light source is divided into the light flux on the control side and the light flux on the sample side, they are entered into the integrating sphere separately, and detected by a detector. Firstly, the stacked body cut into a size of 50 mm×50 mm was placed on the film holder of the entrance window portion of the integrating sphere for the luminous flux on the sample side of the spectrophotometer so that the functional layer side surface was on the light source side. The stacked body was free from flaws (contamination), cracks, wrinkles and smudges, and was held on the spectrophotometer in a flat, curl-free state. Under this situation, the transmittance was measured under the measurement conditions of at least two points for each 1 nm space back and forth between wavelength of 300 nm or more and 780 nm or less, and the transmitted yellowness measured by a colorimetry method using an integrating sphere (second transmitted yellowness) ($YI_2$) was determined from the tristimulus values in the XYZ color system, according to JIS K7373:2006.

(Measurement Conditions)

Wavelength range: 300 nm or more and 780 nm or less
Scan speed: fast
Slit width: 5.0 nm
Sampling interval: 0.5 nm interval
Illumination: C
Light source: D2 and WI
Switching wavelength of light source: 360 nm
S/R switch: standard
Auto Zero: carried out at 550 nm after baseline scan The value ($\Delta(YI_1)$) obtained by subtracting the second transmitted yellowness ($YI_2$) from the first transmitted yellowness ($YI_1$) was determined from the following formula.

$$\Delta YI_1 = YI_1 - YI_2$$

(2) Difference of Transmitted Yellowness Difference Before and After Light Resistance Test ($\Delta(YI_2)$)

the following light resistance test was carried out on the stacked body. Using a xenon light resistance tester (product name "Ci4000" from Atlas Material Testing Technology), the stacked body cut into a size of 135 mm×60 mm was placed on the film holder of the xenon light resistance tester so that the functional layer side surface was on the light source side. The stacked body was free from flaws (contamination), cracks, wrinkles and smudges, and was held on the xenon light resistance tester in a flat, curl-free state. The sample was exposed under the conditions of irradiance of 60 $W/m^2$, wavelength of 300 nm or more and 400 nm or less, and at 50 °C 50% RH for 24 hours.

Then, the transmitted yellowness of the stacked body was measured by the colorimetry method not using the integrating sphere.

Then, from the following formula, the difference of the transmitted yellowness ($YI_1$) before the light resistance test and the transmitted yellowness ($YI_3$) after the light resistance test, that is, the yellowing degree ($\Delta YI_2$), was obtained.

$$\Delta YI_2 = YI_3 - YI_1$$

(3) Haze

The haze of the stacked body was measured according to JIS K-7136 with a haze meter (HM150 from Murakami Color Research Laboratory Co., Ltd). Also, the haze of the initial stacked body and the stacked body after the light resistance test described above were measured.

(4) Pencil Hardness

For the functional layer side surface of the stacked body, a pencil hardness test specified by JIS K5600-5-4 (1999) was carried out using a pencil for the test specified by JIS-S-6006 and Pencil Scratch Hardness Tester from Toyo Seiki Seisaku-sho, Ltd. The measurement conditions were angle of 45°, load of 750 g, speed of 0.5 mm/sec or more and 1 mm/sec or less, and temperature of 23±2 °C. Also, the pencil hardness test was carried out for the initial stacked body and the stacked body after the light resistance test described above. The highest pencil hardness at which the sample was not bruised is shown in Table 1 and Table 2 below. Incidentally, when measuring the pencil hardness, a plurality of pencils having different hardness were used. The pencil hardness test was carried out for 5 times for one pencil, and when the surface of the stacked body was not bruised for 4 times or more out of 5 times, the surface of the stacked body was determined as not bruised by the pencil with that hardness. The bruise is referred to as a white bruise which was visible when the surface of the stacked body after the pencil hardness test was transmissively observed under a fluorescent light.

(5) Coating Film Adhesiveness

Cellulose Tape No. 405 (industrial 24 mm) from Nichiban Co., Ltd. Was adhered to the functional layer side surface of the stacked body with a length of 1 cm or more without air bubbles, and after leaving to stand for 30 seconds, the tape was peeled off for one time in the vertical direction at a speed of 0.5 s/cm or more and 1 s/cm or less. After the peeling for one time, the test section was visually observed under a fluorescent light to confirm the presence or absence of peeling of the coating film. The coating film adhesiveness was evaluated according to the following criteria.

A: No peeling of the coating film

B: There is a peeling of the coating film (6) Dynamic Bending Property

The following dynamic bending test was carried out to the stacked body to evaluate the bending resistance. Firstly, a stacked body having a size of 20 mm×100 mm was prepared. Then, as shown in FIG. 2A, short side portion 1C and short side portion 1D, opposing to the short side portion 1C, of the stacked body for a display device 1 were respectively fixed by parallelly arranged fixing portions 51. Then, as shown in FIG. 2B, by moving the fixing portions 51 so as to be closer to each other, the stacked body for a display device 1 was deformed so as to be folded. Further, as shown in FIG. 2C, after moving the fixing portions 51 to the position wherein distance "d" between the two opposing short side portions 1C and 1D of the stacked body for a display device 1 fixed by the fixing portions 51 was a predetermined value, the deformation of the stacked body for a display device 1 was dissolved by moving the fixing portions 51 in opposite directions. As shown in FIGS. 2A to 2C, by moving the fixing portions 51, the stacked body for a display device 1 was folded into 180° repeatedly. When doing so, the distance "d" between the two opposing short side portions 1C and 1D of the stacked body for a display device 1 was 10 mm. Also, when the stacked body was folded so that the functional layer faces inward, it was regarded as an incurve, and when the stacked body was folded so that the functional layer faces outward, it was regarded as an outcurve. Also, the dynamic bending test was carried out for the initial stacked body and the stacked body after the light resistance test described above. The results of the dynamic bending test were evaluated according to the following criteria.

A: No crack or fracture occurred in the stacked body even for 300,000 times

B: A crack or a fracture occurred in the stacked body up to 300,000 times (7) Distribution of Inorganic Based Ultraviolet Absorber For the stacked body in Example 1 and Example 13, the distribution of the inorganic based ultraviolet absorber in the thickness direction of the functional layer was measured by a depth direction analysis of the functional layer using a time of flight secondary ion mass spectrometer (TOF-SIMS). A time of flight secondary ion mass spectrometer (TOF-SIMS) (TOF-SIMS5 from IONTOF GmbH) was used for the measurement.

(Measurement Conditions)

Primary ions: $Bi_3^{++}$
Primary ion acceleration voltage: 30 kV
Primary ion current: 0.2 pA
Measurement area: 500 μm×500 μm
Number of pixels: 128 pixels×128 pixels
Scan: 16 scans
Charge compensation: Electron irradiation Then, the content of the inorganic based ultraviolet absorber included in a portion from a surface of the functional layer, on an opposite side surface to the substrate layer, to a position half a thickness of the functional layer, when a content of the inorganic based ultraviolet absorber in the functional layer was 100% by mass, was determined. The content of the inorganic based ultraviolet absorber included in a portion from a surface of the functional layer, on an opposite side surface to the substrate layer, to a position half a thickness of the functional layer in Example 1 was 52% by mass, whereas the same was 73% by mass in Example 13.

(8) Distribution of Organic Based Ultraviolet Absorber

For the stacked body in Example 1, Example 3 and Example 13, the distribution of the organic based ultraviolet absorber in the thickness direction of the functional layer was measured by a depth direction analysis of the functional layer using a time of flight secondary ion mass spectrometer (TOF-SIMS). A time of flight secondary ion mass spectrometer (TOF-SIMS) (TOF-SIMS5 from IONTOF GmbH) was used for the measurement.

(Measurement Conditions)

Primary ions: $Bi_3^{++}$
Primary ion acceleration voltage: 30 kV
Primary ion current: 0.2 pA
Measurement area: 500 μm×500 μm
Number of pixels: 128 pixels×128 pixels
Scan: 16 scans
Charge compensation: Electron irradiation Firstly, the functional layer was divided into 10 parts in the depth direction, and the peak intensity of the organic based ultraviolet absorber was measured in each divided part. Then, the average value of the peak intensities measured at the 10 locations described above was calculated. Then, using the calculated average value as 1, the ratio of the peak intensity in each part of the 10 locations to the calculated average value was yellowing degree calculated.

In Example 1, the ratio of the maximum peak intensity with respect to the average value was 1.2, and the ratio of the minimum peak intensity was 0.9. In Example 3, the ratio of the maximum peak intensity with respect to the average value was 1.2, and the ratio of the minimum peak intensity was 0.8. In Example 13, the ratio of the maximum peak intensity with respect to the average value was 1.4, and the ratio of the minimum peak intensity was 0.6.

TABLE 1

| | Organic UV absorber content (mass parts) | Inorganic UV absorber content (mass parts) | Color conditioner content (mass parts) | Silica content (mass parts) | Initial | | | | | |
|---|---|---|---|---|---|---|---|---|---|---|
| | | | | | Yellowness | | | | | |
| | | | | | $YI_1$ (no integrating sphere) | $YI_2$ (with integrating sphere) | $\Delta YI_1$ | Haze (%) | Pencil hardness | Coating film adhesiveness |
| Ex. 1 | 2 | 1 | 0 | 0 | 3.8 | 2.5 | 1.3 | 0.6 | 4H | A |
| Ex. 2 | 2 | 3 | 0 | 0 | 6.4 | 2.8 | 3.6 | 1.2 | 4H | A |
| Ex. 3 | 2 | 1 | 0 | 50 | 4.2 | 2.6 | 1.6 | 0.8 | 5H | A |
| Ex. 4 | 2 | 3 | 0 | 50 | 7.1 | 4.9 | 2.2 | 1.4 | 5H | A |
| Ex. 5 | 2 | 1 | 0.1 | 0 | 0.7 | 0.2 | 0.5 | 0.6 | 4H | A |
| Ex. 6 | 2 | 1 | 0.1 | 50 | 1.0 | 0.4 | 0.6 | 0.8 | 5H | A |
| Ex. 7 | 1 | 1 | 0 | 0 | 3.3 | 2.2 | 1.1 | 0.6 | 4H | A |
| Ex. 8 | 5 | 1 | 0 | 0 | 4.3 | 3.6 | 0.7 | 0.7 | 4H | A |
| Ex. 9 | 5 | 1 | 0 | 50 | 7.7 | 4.9 | 2.8 | 1.0 | 5H | A |
| Ex. 10 | 5 | 1 | 0.1 | 0 | 1.2 | 0.7 | 0.5 | 0.9 | 4H | A |
| Ex. 11 | 5 | 1 | 0.1 | 50 | 1.7 | 1.1 | 0.6 | 1.0 | 5H | A |
| Ex. 12 | 2 | 1 | 0 | 0 | 4.5 | 3.3 | 1.7 | 1.1 | 4H | A |
| Ex. 13 | 2 | 1 | 0 | 0 | 4.4 | 2.6 | 1.8 | 1.1 | 4H | A |
| Ex. 14 | 2 | 1 | 0 | 50 | 5.8 | 3.1 | 2.7 | 1.4 | 5H | A |
| Ex. 15 | 2 | 1 | 0 | 0 | 7.0 | 5.1 | 1.9 | 1.6 | 4H | A |
| Ex. 16 | 2 | 6 | 0 | 50 | 9.5 | 6.3 | 3.2 | 2.7 | 4H | A |
| Ex. 17 | 2 | 1 | 0 | 0 | 3.9 | 2.5 | 1.4 | 0.7 | 5H | A |
| Ex. 18 | 2 | 1 | 0 | 50 | 4.4 | 2.7 | 1.7 | 0.7 | 6H | A |
| Ex. 19 | 2 | 1 | 0.1 | 0 | 0.8 | 0.2 | 0.6 | 0.6 | 5H | A |
| Ex. 20 | 2 | 1 | 0.1 | 50 | 1.2 | 0.5 | 0.7 | 0.7 | 6H | A |
| Ex. 21 | 2 | 1 | 0 | 0 | 4.0 | 2.6 | 1.4 | 0.6 | 5H | A |
| Ex. 22 | 2 | 1 | 0 | 0 | 4.3 | 2.7 | 1.6 | 0.7 | 6H | A |

TABLE 1-continued

| | Initial | | After light resistance test | | | | | | |
|---|---|---|---|---|---|---|---|---|---|
| | Dynamic bending property | | Yellowness | | | | | Dynamic bending property | |
| | Incurve | Out-curve | $YI_3$ (no inte-grating sphere) | $\Delta YI_2$ | Haze (%) | Pencil hard-ness | Coating film adhe-siveness | Incurve | Out-curve |
| Ex. 1 | A | A | 5.0 | 1.2 | 0.6 | 4H | A | A | A |
| Ex. 2 | A | A | 7.3 | 0.9 | 1.1 | 4H | A | A | A |
| Ex. 3 | A | A | 5.2 | 1.0 | 0.7 | 5H | A | A | A |
| Ex. 4 | A | A | 7.8 | 0.7 | 1.4 | 5H | A | A | A |
| Ex. 5 | A | A | 1.8 | 1.1 | 0.6 | 4H | A | A | A |
| Ex. 6 | A | A | 1.9 | 0.9 | 0.8 | 5H | A | A | A |
| Ex. 7 | A | A | 5.2 | 1.9 | 0.5 | 4H | A | A | A |
| Ex. 8 | A | A | 5.3 | 1.0 | 0.7 | 4H | A | A | A |
| Ex. 9 | A | A | 8.5 | 0.8 | 1.0 | 5H | A | A | A |
| Ex. 10 | A | A | 2.1 | 0.9 | 0.9 | 4H | A | A | A |
| Ex. 11 | A | A | 2.4 | 0.7 | 0.8 | 5H | A | A | A |
| Ex. 12 | A | A | 5.4 | 0.9 | 1.1 | 4H | A | A | A |
| Ex. 13 | A | A | 5.1 | 0.7 | 1.2 | 4H | A | A | A |
| Ex. 14 | A | A | 6.4 | 0.6 | 1.2 | 5H | A | A | A |
| Ex. 15 | A | A | 7.6 | 0.6 | 1.7 | 4H | A | A | A |
| Ex. 16 | A | A | 9.9 | 0.4 | 2.9 | 4H | A | A | A |
| Ex. 17 | A | A | 5.1 | 1.2 | 0.8 | 5H | A | A | A |
| Ex. 18 | A | A | 5.4 | 1.0 | 0.7 | 6H | A | A | A |
| Ex. 19 | A | A | 1.7 | 0.9 | 0.7 | 5H | A | A | A |
| Ex. 20 | A | A | 1.9 | 0.7 | 0.8 | 6H | A | A | A |
| Ex. 21 | A | A | 5.3 | 1.3 | 0.7 | 5H | A | A | A |
| Ex. 22 | A | A | 5.6 | 1.3 | 0.7 | 6H | A | A | A |

TABLE 2

| | Organic UV absorber content (mass parts) | Inorganic UV absorber content (mass parts) | Color conditioner content (mass parts) | Silica content (mass parts) | Initial | | | | | |
|---|---|---|---|---|---|---|---|---|---|---|
| | | | | | Yellowness | | | | | |
| | | | | | $YI_1$ (no inte-grating sphere) | $YI_2$ (with inte-grating sphere) | $\Delta YI_1$ | Haze (%) | Pencil hard-ness | Coating film adhe-siveness |
| Comp. Ex. 1 | 0 | 0 | 0 | 0 | 1.4 | 1.2 | 0.2 | 0.6 | 4H | A |
| Comp. Ex. 2 | 0 | 0 | 0 | 50 | 1.4 | 1.1 | 0.3 | 0.6 | 5H | A |
| Comp. Ex. 3 | 1 | 0 | 0 | 0 | 1.6 | 1.5 | 0.1 | 0.7 | 4H | A |
| Comp. Ex. 4 | 10 | 0 | 0 | 0 | 6.1 | 6.4 | −0.3 | 0.8 | H | A |
| Comp. Ex. 5 | 2 | 0 | 0.1 | 0 | 0.4 | 0.3 | 0.1 | 0.8 | 4H | A |
| Comp. Ex. 6 | 2 | 0 | 0.1 | 50 | 0.5 | 0.3 | 0.2 | 0.8 | 5H | A |
| Comp. Ex. 7 | 0 | 1 | 0 | 0 | 1.6 | 0.9 | 0.7 | 0.7 | 4H | A |
| Comp. Ex. 8 | 0 | 3 | 0 | 0 | 3.0 | 1.1 | 1.9 | 1.2 | 4H | A |
| Comp. Ex. 9 | 0 | 3 | 0.1 | 0 | 2.6 | 1.4 | 1.2 | 1.1 | 4H | A |
| Comp. Ex. 10 | 0 | 3 | 0 | 50 | 6.4 | 3.5 | 2.9 | 1.4 | 5H | A |
| Comp. Ex. 11 | 0 | 3 | 0.1 | 50 | 3.1 | 1.7 | 1.4 | 1.4 | 5H | A |
| Comp. Ex. 12 | 2 | 1 | 0 | 0 | 2.3 | 2.0 | 0.3 | 0.6 | 4H | A |

TABLE 2-continued

| | Initial | | After light resistance test | | | | | | | |
|---|---|---|---|---|---|---|---|---|---|---|
| | Dynamic bending property | | Yellowness | | | | | | Dynamic bending property | |
| | Incurve | Outcurve | $YI_3$ (no integrating sphere) | $\Delta YI_2$ | Haze (%) | Pencil hardness | Coating film adhesiveness | | Incurve | Outcurve |
| Comp. Ex. 1 | A | A | 6.1 | 4.7 | 0.6 | 4H | B | | A | B |
| Comp. Ex. 2 | A | A | 6.0 | 4.6 | 0.6 | 5H | B | | A | B |
| Comp. Ex. 3 | A | A | 5.3 | 3.7 | 0.7 | 4H | B | | A | B |
| Comp. Ex. 4 | A | A | 6.8 | 0.7 | 0.8 | H | A | | A | A |
| Comp. Ex. 5 | A | A | 2.5 | 2.1 | 0.8 | 4H | A | | A | A |
| Comp. Ex. 6 | A | A | 2.7 | 2.2 | 0.7 | 5H | A | | A | A |
| Comp. Ex. 7 | A | A | 5.0 | 3.4 | 0.7 | 4H | B | | A | B |
| Comp. Ex. 8 | A | A | 5.1 | 2.1 | 1.1 | 4H | A | | A | B |
| Comp. Ex. 9 | A | A | 4.7 | 2.1 | 1.0 | 4H | A | | A | A |
| Comp. Ex. 10 | A | A | 9.1 | 2.7 | 1.4 | 5H | A | | A | A |
| Comp. Ex. 11 | A | A | 5.3 | 2.2 | 1.3 | 5H | A | | A | A |
| Comp. Ex. 12 | A | A | 5.5 | 3.2 | 0.6 | 4H | A | | A | A |

From the Table 1 and Table 2, it was confirmed that both light resistance and surface hardness may be achieved at a high level, when the functional layer includes the organic based ultraviolet absorber and inorganic based ultraviolet absorber, and the value obtained by subtracting the second transmitted yellowness from the first transmitted yellowness was the predetermined value or more.

Also, by comparing Examples 1, 12 and 15 with Comparative Example 12, it was confirmed that both light resistance and surface hardness may be achieved at a high level, while maintaining transparency, when the average particle size of the inorganic based ultraviolet absorber was in the predetermined range.

Also, by comparing Examples 3 and 4 with Examples 1 and 16, it was confirmed that both light resistance and surface hardness may be achieved at a high level, while maintaining transparency, when the ratio between the inorganic based ultraviolet absorber and silica particles was in the predetermined range.

Also, by comparing Example 13 with Example 1, it was confirmed that light resistance and surface hardness may be achieved at a high level, while maintaining transparency, when the distribution of the inorganic based ultraviolet absorber in the functional layer was in the predetermined range.

Also, as shown in Examples 17 to 20, it was confirmed that the pencil hardness may be made harder by providing a second functional layer.

Also, as shown in Examples 21 to 22, it was confirmed that the pencil hardness may be made harder by providing a second functional layer on the substrate layer, on an opposite surface side to the functional layer.

REFERENCE SIGNS LIST

1: Stacked body for a display device
2: Substrate layer
3: Functional layer
5: Impact absorbing layer
6: Adhesive layer for adhesion
7: Interlayer adhesive layer
20: Flexible display device
21: Display panel

The invention claimed is:

1. A stacked body for a display device comprising a substrate layer; and a functional layer, wherein the functional layer includes a resin, an organic based ultraviolet absorber, and an inorganic based ultraviolet absorber;

when a transmitted yellowness measured by a colorimetry method not using an integrating sphere is regarded as a first transmitted yellowness, and a transmitted yellowness measured by a colorimetry method using an integrating sphere is regarded as a second transmitted yellowness, a value obtained by subtracting the second transmitted yellowness of the stacked body for a display device from the first transmitted yellowness of the stacked body for a display device is 0.4 or more, wherein both of the first and second transmitted yellowness values are determined from tristimulus values in an XYZ color system, according to JIS K7373:2006;

the functional layer includes an inorganic particle; and an amount of the inorganic particle included in the functional layer is more than an amount of the inorganic based ultraviolet absorber, on a mass basis.

2. The stacked body for a display device according to claim 1, wherein an average particle size of the inorganic based ultraviolet absorber is 10 nm or more and 100 nm or less.

3. The stacked body for a display device according to claim 1, wherein the inorganic based ultraviolet absorber is unevenly distributed on a surface of the functional layer, on an opposite side surface to the substrate layer.

4. The stacked body for a display device according to claim 3, wherein, when a content of the inorganic based ultraviolet absorber in the functional layer is 100% by mass, a content of the inorganic based ultraviolet absorber included in a portion from a surface of the functional layer, on an opposite side surface to the substrate layer, to a position half a thickness of the functional layer is 70% by mass or more.

5. The stacked body for a display device according to claim 1, wherein the organic based ultraviolet absorber is evenly distributed in the functional layer.

6. The stacked body for a display device according to claim 1, wherein a mass ratio of the inorganic based ultraviolet absorber and the inorganic particle is 1:99 to 10:90.

7. The stacked body for a display device according to claim 1, wherein the functional layer includes a color conditioner.

8. The stacked body for a display device according to claim 1, wherein the substrate is a resin substrate.

9. The stacked body for a display device according to claim 8, wherein the resin substrate includes polyimide based resin.

10. The stacked body for a display device body according to claim 1, wherein an impact absorbing layer is included on the substrate layer, on an opposite surface side to the functional layer, or between the substrate layer and the functional layer.

11. The stacked body for a display device according to claim 1, wherein an adhesive layer for adhesion is included on the substrate layer, on an opposite surface side to the functional layer.

12. The stacked body for a display device according to claim 1, wherein a second functional layer is included on the functional layer, on an opposite surface side to the substrate layer.

13. The stacked body for a display device according to claim 1, wherein a second functional layer is included on the substrate layer, on an opposite surface side to the functional layer.

14. A display device comprising:

a display panel, and the stacked body for a display device according to claim 1 placed on an observer side of the display panel.

15. A stacked body for a display device comprising a substrate layer; and a functional layer, wherein the functional layer includes a resin, an organic based ultraviolet absorber, and an inorganic based ultraviolet absorber;

when a transmitted yellowness measured by a colorimetry method not using an integrating sphere is regarded as a first transmitted yellowness, and a transmitted yellowness measured by a colorimetry method using an integrating sphere is regarded as a second transmitted yellowness, a value obtained by subtracting the second transmitted yellowness of the stacked body for a display device from the first transmitted yellowness of the stacked body for a display device is 0.4 or more, wherein both of the first and second transmitted yellowness values are determined from tristimulus values in an XYZ color system, according to JIS K7373:2006; and an impact absorbing layer is included on the substrate layer, on an opposite surface side to the functional layer, or between the substrate layer and the functional layer.

16. A display device comprising:

a display panel, and the stacked body for a display device according to claim 15 placed on an observer side of the display panel.

17. A stacked body for a display device comprising a substrate layer; and a functional layer, wherein the functional layer includes a resin, an organic based ultraviolet absorber, and an inorganic based ultraviolet absorber;

when a transmitted yellowness measured by a colorimetry method not using an integrating sphere is regarded as a first transmitted yellowness, and a transmitted yellowness measured by a colorimetry method using an integrating sphere is regarded as a second transmitted yellowness, a value obtained by subtracting the second transmitted yellowness of the stacked body for a display device from the first transmitted yellowness of the stacked body for a display device is 0.4 or more, wherein both of the first and second transmitted yellowness values are determined from tristimulus values in an XYZ color system, according to JIS K7373:2006; and a second functional layer is included on the functional layer, on an opposite surface side to the substrate layer.

18. A display device comprising:

a display panel, and the stacked body for a display device according to claim 17 placed on an observer side of the display panel.

* * * * *